(12) United States Patent
Battisti

(10) Patent No.: US 11,117,254 B2
(45) Date of Patent: Sep. 14, 2021

(54) ROBOTIC NAVIGATION SYSTEM AND METHOD

(71) Applicant: Comprehensive Engineering Solutions, Inc., Zionsville, IN (US)

(72) Inventor: Mark A. Battisti, Zionsville, IN (US)

(73) Assignee: Comprehensive Engineering Solutions, Inc., Zionsville, IN (US)

( * ) Notice: Subject to any disclaimer, the term of this patent is extended or adjusted under 35 U.S.C. 154(b) by 49 days.

(21) Appl. No.: 16/775,446

(22) Filed: Jan. 29, 2020

(65) Prior Publication Data

US 2020/0164503 A1 May 28, 2020

Related U.S. Application Data

(63) Continuation of application No. 15/905,301, filed on Feb. 26, 2018, now abandoned, which is a continuation of application No. 14/947,836, filed on Nov. 20, 2015, now abandoned, which is a continuation-in-part of application No. 14/811,440, filed on Jul. 28, 2015, now abandoned.

(51) Int. Cl.
*B25J 9/00* (2006.01)
*B25J 9/16* (2006.01)
*B25J 13/06* (2006.01)

(52) U.S. Cl.
CPC .......... *B25J 9/0081* (2013.01); *B25J 9/1684* (2013.01); *B25J 13/065* (2013.01); *G05B 2219/35416* (2013.01); *G05B 2219/36162* (2013.01); *G05B 2219/39439* (2013.01); *Y10S 901/47* (2013.01)

(58) Field of Classification Search
CPC .......................................... G05B 2219/393439
See application file for complete search history.

(56) References Cited

U.S. PATENT DOCUMENTS

| | | | |
|---|---|---|---|
| 4,804,897 A * | 2/1989 | Gordon | G05B 19/427 318/568.11 |
| 5,132,887 A * | 7/1992 | Torii | B23K 26/0884 219/121.78 |
| 5,339,103 A | 8/1994 | Schmidt | |
| 5,617,515 A | 4/1997 | MacLaren | |
| 5,790,401 A | 8/1998 | Shields | |
| 5,852,269 A * | 12/1998 | Toyonaga | B23H 7/065 219/69.12 |
| 6,285,920 B1 | 9/2001 | McGee | |
| 6,941,192 B2 | 9/2005 | Tang | |
| 8,010,234 B2 | 8/2011 | Henne | |

(Continued)

*Primary Examiner* — Ryan Rink
(74) *Attorney, Agent, or Firm* — Maginot, Moore & Beck, LLP

(57) ABSTRACT

A robotic navigation system includes a handheld navigation unit associated with a frame of reference. The handheld navigation unit is moveable with respect to a plurality of axes and is configured to send movement signals based on movement of the handheld navigation unit. A controller is configured to receive the movement signals from the handheld navigation unit and determine control signals for the robot. The control signals are configured to incrementally move the robot with respect to a point of interest removed from the robot. The point of interest is removed from a fixed point on the robot as defined by assigned coordinates. The controller is further configured to reassign the assigned coordinates following each incremental movement of the robot.

19 Claims, 20 Drawing Sheets

(56) References Cited

U.S. PATENT DOCUMENTS

| | | | |
|---|---|---|---|
| 8,345,004 B1 | 1/2013 | Kass | |
| 8,345,066 B2 * | 1/2013 | Moritz | G06F 3/011 345/633 |
| 8,478,443 B2 | 7/2013 | Hashimoto | |
| 8,694,160 B2 | 4/2014 | Yasue | |
| 8,958,912 B2 | 2/2015 | Blumberg | |
| 9,456,524 B2 | 9/2016 | Ohfuchi | |
| 9,457,472 B2 | 10/2016 | Igarashi | |
| 2002/0068992 A1 | 6/2002 | Hine | |
| 2004/0189675 A1 | 9/2004 | Pretlove | |
| 2006/0195228 A1 * | 8/2006 | Igarashi | G05B 19/425 700/245 |
| 2008/0255704 A1 | 10/2008 | Braut | |
| 2009/0000112 A1 * | 1/2009 | Ikushima | H01L 21/67715 29/791 |
| 2010/0145520 A1 | 6/2010 | Gerio | |
| 2010/0161125 A1 * | 6/2010 | Aoba | G06T 1/00 700/254 |
| 2010/0321704 A1 | 12/2010 | Kawai | |
| 2011/0265311 A1 | 11/2011 | Kondo | |
| 2012/0098961 A1 * | 4/2012 | Handa | G01B 11/2518 348/135 |
| 2012/0130541 A1 | 5/2012 | Szalek | |
| 2014/0166693 A1 | 6/2014 | Williams | |
| 2014/0201112 A1 | 7/2014 | Sawada et al. | |
| 2014/0217076 A1 | 8/2014 | Oe | |
| 2014/0263934 A1 | 9/2014 | Buttrick | |
| 2015/0066199 A1 * | 3/2015 | Shimono | B25J 9/1687 700/218 |
| 2015/0158180 A1 | 6/2015 | Trompeter | |
| 2015/0283644 A1 | 10/2015 | Kawai | |
| 2015/0343561 A1 | 12/2015 | Miller | |
| 2015/0352718 A1 | 12/2015 | Lee | |
| 2016/0243704 A1 * | 8/2016 | Vakanski | B25J 9/1697 |
| 2017/0010356 A1 * | 1/2017 | Demirel | G01B 11/25 |
| 2018/0126553 A1 * | 5/2018 | Corkum | B25J 9/1697 |

* cited by examiner

ROBOTIC NAVIGATION SYSTEM AND METHOD

CROSS-REFERENCE TO RELATED APPLICATIONS

This document is a continuation of U.S. patent application Ser. No. 15/905,301, filed Feb. 26, 2018, which is a continuation of U.S. patent application Ser. No. 14/947,836, filed Nov. 20, 2015, which is a continuation-in-part of U.S. patent application Ser. No. 14/811,440, filed Jul. 28, 2015, the entire contents of which are incorporated herein by reference.

FIELD

This document relates to the field of robotics, and particularly to robotic navigation devices configured to move robots and teach robots paths of movement.

BACKGROUND

Robots are widely used in various forms and for various purposes. Custom gantry, multi-axis slide, and articulated robots are typical in industrial settings. Industrial robots are typically configured to move about a plurality of axes. For example a six-axis robot may be configured to move a tool held by the robot along any of three axes (i.e., position the tool at the desired X, Y, Z coordinates in space), and then orient the tool along any of three additional axes in the designated space (i.e., orient the tool with a desired roll, pitch, yaw in the space). Most robots use electric motors to move the robot's joints, slides, or linkages and place the robot in the desired position.

FIG. 1 shows an exemplary articulated robot 10 configured to move a tool about 6 axes (i.e., the X, Y, Z, roll, pitch, and yaw axes). The robot 10 includes a moveable member. In the embodiment of FIG. 1, the moveable member is an arm 12 with a plurality of linkages 14 and joints 16. A mounting flange 18 is provided at the distal end of the arm 12, and a tool 20 is retained by the mounting flange 18. The linkages 14 and joints 16 of the robot may be manipulated to move the mounting flange 18 at the end of the arm 12 to a desired position in 3-axis space (i.e., X, Y, Z coordinates), and then the mounting flange may be manipulated along three additional axes to provide an attitude (i.e., roll, pitch, yaw) in order to properly orient the tool 20 in space.

With continued reference to FIG. 1, various coordinate frames of reference are defined by the robot including (1) world coordinates 22, and (2) tool coordinates 24. The world coordinates 22 are defined based on the mounting location of the robot, and are therefore the robot coordinates. Accordingly, the zero of the axis of the world coordinates is the center point at the bottom of the robot mount, and the base actuator typically rotates the robot about an axis that extends through this zero point (which may also be referred to herein as the zero coordinate). The tool coordinates 24 are defined as a point at the end of the tool 20 held by the distal end of the robot arm 12. The tool coordinates 24 are a fixed location outward from the end of the mounting flange 18. When the robot 10 is moved, the control system for the robot keeps track of the position of the tool coordinates 24 relative to the world coordinates 22. Accordingly, if a user is controlling movement of the robot 10 from the world coordinates 22 frame, the control system translates movement instructions from the world coordinates 22 to the tool coordinates 24 in order to control operation of the robot. Other coordinates may also be defined based on the world coordinates 22, such as base coordinates 26 positioned on a platform 25 where a work target or other robot controller is located.

The robot controller is responsible for moving the robot 10 and any attached tool 20 to a desired point in space (X, Y, Z) with a specific attitude (roll, pitch, yaw). The robot controller is also responsible for moving the robot 10 and any attached tool 20 along a desired path. In order to make these movements, the robot controller makes calculations based on the kinematics of the robot, and determines the position required by each robot joint and linkage to arrive at each desired point in space. In order to make the desired movements at a point of interest on the robot, the robot must know is what coordinate frame we are interested in manipulating. On a typical robot, what is controlled in the standard control mode is the mounting flange at the end of the arm (which may also be referred to as the "wrist"). However, when a tool is added to the end of the arm it adds an extension to the arm (e.g., 100 mm outward from the wrist and slightly similar to that shown for the tool 20 in FIG. 1). The coordinates at the tip of the tool are the "tool coordinates". So the robot controller may need to control movement of a straight line, arc, etc, not based on the wrist coordinates, but the tool coordinates.

FIGS. 2A-2C and 3A-3C show an exemplary articulated robot including two linkages 14a and 14b, and two joints 16a and 16b. The mounting flange 18 of the robot is holding a tool with a tool tip 21 that must be moved from point A to point B. As shown in FIGS. 2A-2C, if only a single joint 16a and single linkage 14a is moved, the motion of the tool tip 21 is along an arc 28. However, if it is desired to move the tool tip 21 in a straight line path, as shown in FIGS. 3A-3C, it is necessary for the robot controller to create a set of incremental movements for the robot such that the tool tip 21 follows the straight line path 29. With each incremental movement of the robot, both joints 16a and 16b and both linkages 14a and 14b are moved in order to place the tool tip 21 at a new target location. The robot controller then calculates a new target coordinate for the tool tip 21 along with the associated movements required by the robot to cause the robot to move the tool tip 21 to the next target coordinate. While FIGS. 2A-3C illustrate movement of the tool tip 21 along two axes, it will be appreciated that similar movements for the robot may be made along six axes.

Industrial robots often repeat the same steps over and over again in association with some industrial process. However, these robots need to be taught various positions and paths of motion prior to being regularly used for their intended purposes. For example, industrial robots and other multi-axis motion systems used in manufacturing must be taught where to move a tool tip during the manufacturing process or when and how to pick-and-place different parts. Traditional forms of teaching robotic movement include the use of a teach pendant or the use of a hand guided/back driven robot navigation.

Most robots provide some external means to receive commands, and teach pendants make use of these external means to communicate with the robot. The external interface provides a mechanism for an outside application, such as a teach pendant or other navigation device, to control the robot's motion Teach pendants are typically handheld control boxes that allow the user to program the robot. An exemplary prior art teach pendant 30 is shown in FIG. 20. As shown in FIG. 20, the teach pendant 30 includes a numeric and alphabetic keyboard 32 and a screen 34, such as an LCD screen. The teach pendent 30 may also include other input/output devices, such as a joystick, navigation buttons, or an emergency stop 36. Unfortunately, these teach pendants are often unintuitive and intimidating to users who are unfamiliar with the unique inputs of the particular teach pendant. Teach pendants are also limited to the two frames of reference discussed above (i.e., world coordinates or tool coordinates) from which the user may program the robot. Accordingly, the ability to teach a smooth human-like path of a tool tip or other robotic movement tends to be difficult using teach pendants.

Hand guided robot navigation devices allow the user to directly steer the robot in a multitude of axis by directly pushing or pulling the robot in the desired direction. These robots with hand guided robot navigation devices typically have the ability to back drive the motors, thus allowing the robot to be shoved around. Early painting robots used this concept to directly learn paths in a "lead through the nose" style of teaching, much like a record and playback function. Drawbacks to existing hand guided navigation devices and back driven robots is that they cannot accommodate various tool coordinates, and they do not allow for intuitive remote control option.

In view of the foregoing, it would be advantageous to provide a robot navigation device that provides intuitive control of the robot, allowing the user to easily teach and control complex motion paths for purposes of robotic training and servicing. It would also be advantageous if such navigation device would allow the user to control the robot from multiple frames of reference. Additionally, once complex motion path are established by a human using a navigation device, it would be advantageous to allow for alignment, calibration and cleanup of those human generated motion paths. Therefore, it would also be desirable to provide a robotic navigation device and system with the ability to set boundaries on any hand taught motion and automatically maintain alignment to a given surface or edge.

SUMMARY

A robotic navigation device having multiple drive points, frames of reference and coordinate systems is disclosed herein. Control options allow for isolation of work planes providing a navigation device that is intuitive for the user from any one of several different frames of reference. In addition, the robotic navigation device is configured to fit comfortably in the hand of a user and includes easy-to-use buttons for direct control of robotic devices on the robot's end of arm tooling.

In addition to an intuitive navigation device, the system disclosed herein is configured to provide additional control options that introduce external measurements to drive or maintain robot orientation and offsets. This allows for force, position, and feature tracking in conjunction with human manipulation. This allows the user to precisely control the robot's path, smoothing the path to more closely follow an intended path. As a result, the robot may be programmed with an added control dimension, such as maintaining a fixed offset distance of a tool tip from a part, or precisely following the perimeter edge of a part.

In accordance with one exemplary embodiment of the disclosure, there is provided a robotic navigation system configured to move a robot. The robotic navigation system includes a handheld navigation unit associated with a frame of reference. The handheld navigation unit is moveable with respect to a plurality of axes and is configured to send movement signals based on movement of the handheld navigation unit. A controller is configured to receive the movement signals from the handheld navigation unit and determine control signals for the robot. The control signals are configured to incrementally move the robot with respect to a point of interest removed from the robot. The point of interest is removed from a fixed point on the robot as defined by assigned coordinates. The controller is further configured to reassign the assigned coordinates following each incremental movement of the robot.

Pursuant to another exemplary embodiment of the disclosure, there is provided a robotic system comprising a robot including an arm and a mounting flange, wherein the mounting flange is moveable with respect to a point of interest. The point of interest is defined by a set of assigned coordinates relative to a point on the robot. A handheld navigation unit is positioned on the mounting member and associated with a frame of reference. The handheld navigation unit is moveable with respect to a plurality of axes and is configured to send movement signals based on movement of the handheld navigation unit. A controller is configured to receive the movement signals from the handheld navigation unit, determine a current robot location, calculate a target location for the robot, transmit robot control signals configured to move the robot, and reassign the assigned coordinates based on movement of the robot.

In accordance with yet another exemplary embodiment of the disclosure, there is provided a method of controlling a robot. The method comprises receiving movement signals from a handheld navigation unit and determining a current robot location. The method further comprises calculating a target location for the robot relative to a current point of interest, the current point of interest defined by assigned coordinates relative to a point on the robot. Robot control signals configured to move the robot are transmitted. Thereafter, the method comprises reassigning the assigned coordinates based on movement of the robot.

The above described features and advantages, as well as others, will become more readily apparent to those of ordinary skill in the art by reference to the following detailed description and accompanying drawings. While it would be desirable to provide a robotic navigation device and system that provides one or more of these or other advantageous features, the teachings disclosed herein extend to those embodiments which fall within the scope of the appended claims, regardless of whether they accomplish one or more of the above-mentioned advantages.

DESCRIPTION

Figure 4A:
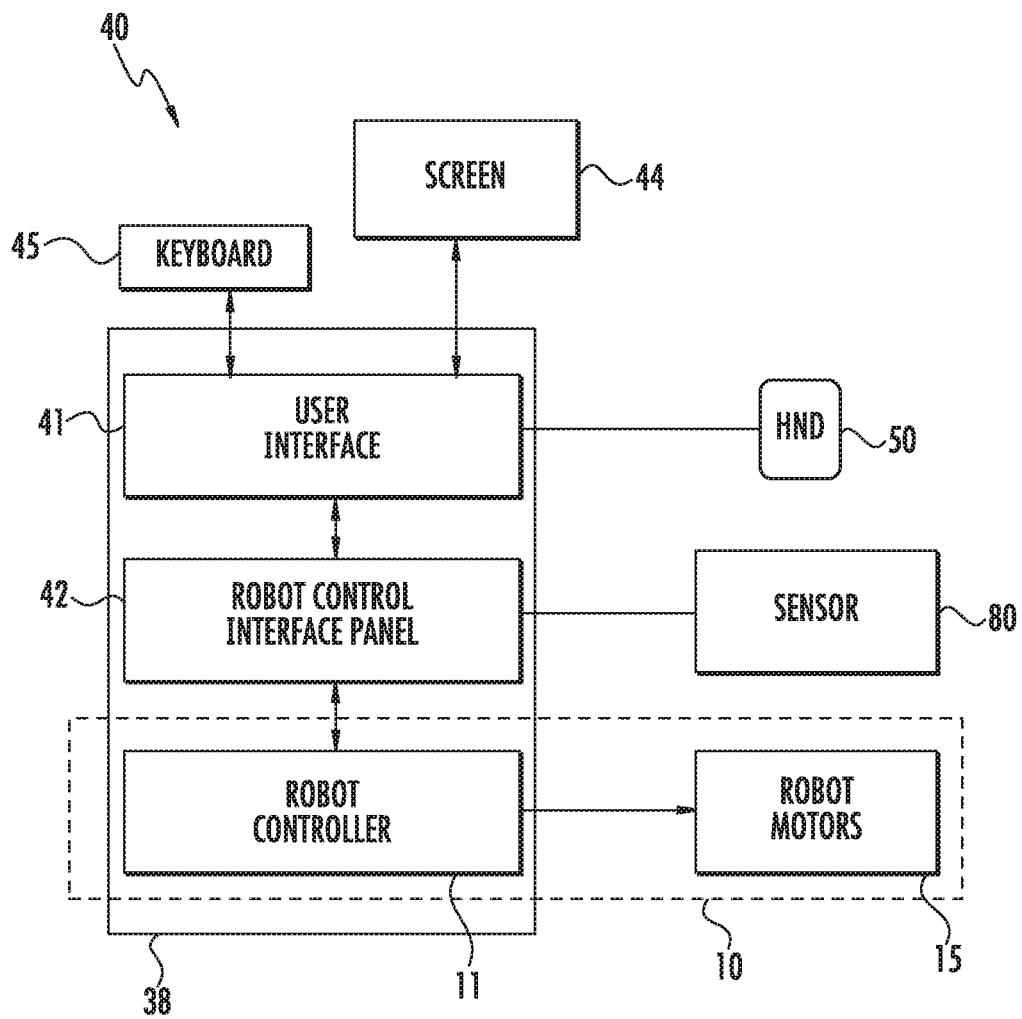
FIG. 4A shows a block diagram of a robotic navigation system and an associated robot.

With reference to FIG. 4A, in at least one embodiment a robotic navigation system 40 includes a robot control interface panel 42, a user interface 41, a handheld navigation unit 50, and at least one sensor 80. The robotic navigation system 40 is configured for use in association with a robot 10, such articulated industrial robots (e.g., see FIG. 1), gantry robots, or any of various other robots, as will be recognized by those of ordinary skill in the art. The robot 10 includes moving parts, such as an arm that is controlled by electric motors 15, and a robotic control system 11, which includes a microprocessor, memory and other electronic components. The robot control interface panel 42 is in communication with the control system 11 of the robot and provides control signals to the control system 11 of the robot in order to control movement of the robot. The handheld navigation unit 50 (which may also be referred to herein as a "handheld control unit") is in communication with the user interface 41 and the electronic control unit 42. As explained in further detail below, manipulation of the handheld navigation unit 50 by a user results in control signals being sent to the robot control interface panel 42. The robot control interface panel 42 also receives input signals from one or more sensors 80.

Based on the input from the handheld navigation unit 50 and the sensor 80, the robot control interface translates the control signals from the handheld navigation unit 50 into control signals appropriate for use by the robot. Advantageously, the robotic navigation system 40 including a handheld navigation device 50 and at least one sensor 80 is configured to allow control of the robot 10 by the user in any of various modes, as explained in further detail below.

Robot Control Interface Panel and User Interface

Figure 4B:
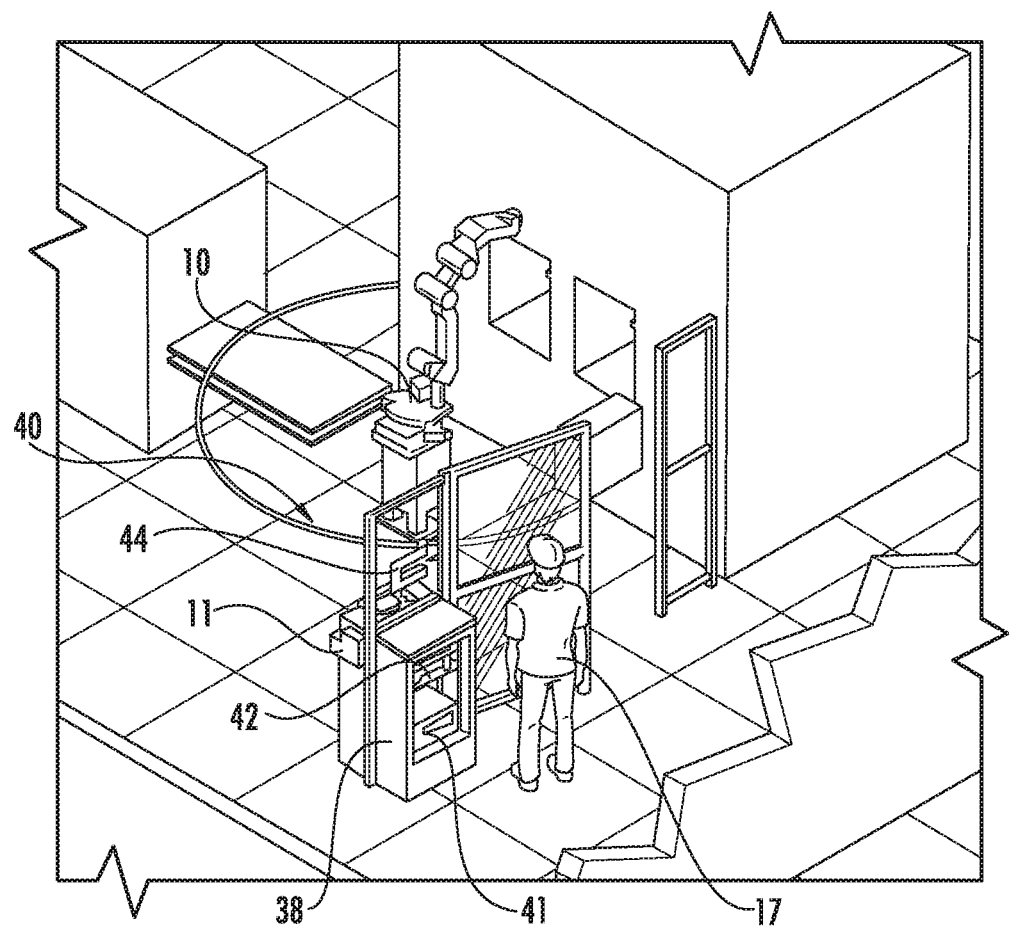
FIG. 4B shows a perspective view of an exemplary embodiment of the robotic navigation system and robot of FIG. 4A.

The robot control interface panel (which may also be referred to herein as the "electronic control unit") 42 is generally a computer including a processor, memory, and various electronic components coupled to a user interface 41. In at least one embodiment, the robot control interface panel 42 may be a panel that is housed in a common housing 38 with the robot controller 11 and the user interface 41. FIG. 4B shows a human user/operator 17 next to the robotic navigation system 40, with the user interface 41, robot control interface panel 42, and robot controller 11 all housed in a common housing 38. However, it will be recognized that the robot control interface panel 42 may also be housed separately from the robot controller 11.

The robot control interface panel 42 receives instructions for robot movement from the handheld control unit 50 and performs calculations that are delivered to the robot controller 11 and result in control signals for movement of the robot 10. In particular, a user moves the handheld navigation unit 50 with respect to one or more of a plurality of axes to indicate a commanded movement for the robot. The handheld navigation unit provides movement signals based on the user's commanded movement for the robot. These movement signals from the handheld navigation unit 50 are then delivered to the robot control interface panel 42 (e.g., via the user interface 41). The movement signals from the handheld navigation unit are generally push force signals provided as a multi-axis vector that includes a linear movement component, a rotational component, and a speed component. The electronic control unit 42 may manipulate this multi-axis vector by forcing to zero the axis that are disabled according to the motion settings (e.g., for purposes of maintaining a plane, or other limitations as described in further detail below). The electronic control unit 42 may also multiply the vector by the speed setting to obtain an appropriate control signal based on the user input, input from the sensor 80, and various settings of the robotic navigation system 40.

After receiving and manipulating the signal from the handheld navigation unit 50, the electronic control unit 42 reads the current robot location and calculates a new target coordinates for the robot based at least in part on the received and manipulated signal from the handheld navigation unit 50, and at least in on the signal from the sensor 80. Calculation of a new target coordinates thus includes translating the vector received from the handheld navigation unit into a robot motion vector. The electronic control unit 42 then delivers the robot motion vector to the robot controller 11, and the robot controller operates the robot motors 15 to move robot to the calculated new location.

It will be noted that the robot control interface panel 42 is separate from the robot controller 11 in the embodiment of FIG. 4A. Accordingly, the arrangement of FIG. 4A is distinct from other systems wherein the robot controller 11 stores and generates all coordinates for the robot. In the embodiment of FIG. 4A, robot coordinates are generated and stored separate from the robot 10 and robot controller, and these coordinates are then sent to the robot controller 11 to cause the robot to move to the desired position.

With continued reference to FIG. 4A, the user interface 41 is in communication with the robot control interface panel 42 and provided for communications with a user of the robotic navigation system 40. The user interface 41 provides the user with various means of communicating with the robot control interface panel 42. For example, as shown in FIG. 4A, the user interface 41 may include or be associated with a number of I/O devices such as a keyboard 45, a display or touch screen 44, lights, speakers, haptic devices, or any of various other I/O devices as will be recognized by those of ordinary skill in the art. In the embodiment of FIG. 4A, the user interface 41 is also connected to the handheld navigation device 50 (HND) and transfers signals from the handheld navigation device 50 to the robot control interface panel 42. It will be appreciated that in other embodiments, the arrangement of FIG. 4A may be different. For example, the handheld navigation unit 50 may communicate directly with the robot control interface panel 42, or the various components may be differently arranged or housed from what is shown in FIG. 4A. Also, the user interface 41 may be provided in any of various forms and configurations such as a desktop computer, laptop computer, or tablet computer, and may be in communication with the robot control interface panel 42 via direct wired communications or remote wireless communications.

Figure 4C:
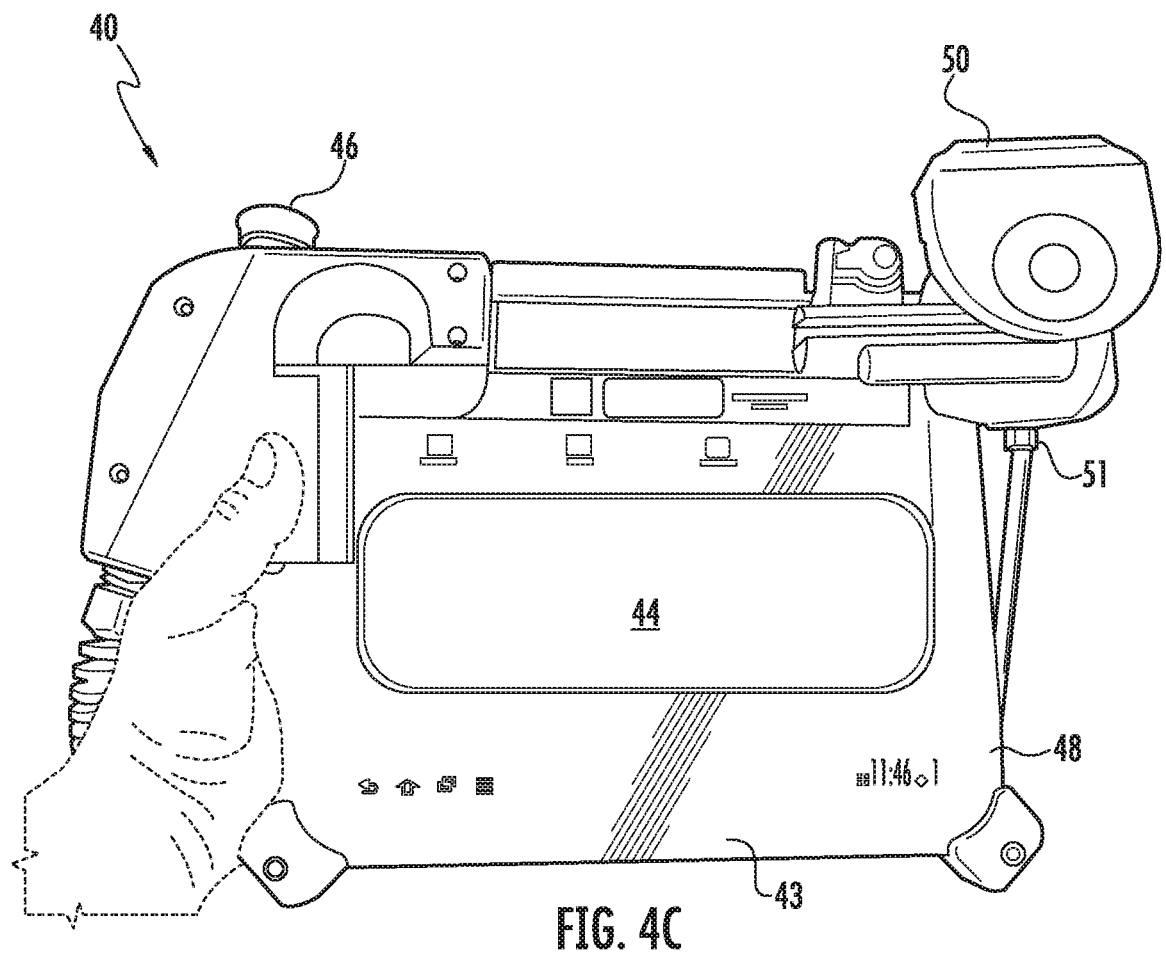
FIG. 4C shows a front view of a tablet computer and handheld navigation unit of the robotic navigation system of FIG. 4A.
Figure 5:
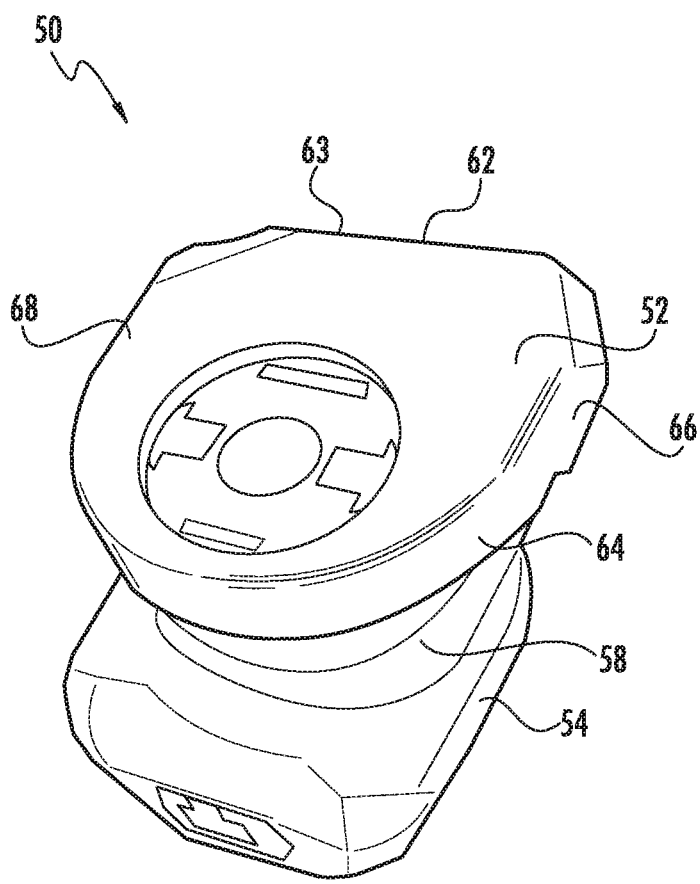
FIG. 5 shows a top perspective view of the handheld navigation unit of FIG. 4A.

With reference now to FIG. 4C, in at least one embodiment the screen 44 of the user interface 41 is provided in association with a tablet computer 43. The screen 44 on the tablet computer 43 which provides the user with a remote desktop view of a stationary main computer screen (i.e., a remote screen from a screen fixed relative to the housing 38 in FIG. 4A). This tablet computer 43 generally includes a microprocessor, memory, communications modules, and a number of I/O devices, each of which will be recognized by those of ordinary skill in the art, all provided within a housing 48. The housing 48 is typically a durable housing configured to protect the electronic components therein and suitable for use in an industrial setting. The housing 48 may also include a seat 51 for the handheld navigation unit 50, allowing the handheld navigation unit 50 to be easily carried by and released from the housing 48. The seat 51 may be provided in any number of forms, such as a clip or recess in the housing 48.

In the embodiment of FIGS. 4A-4C, the I/O devices associated with the user interface 41 and the tablet computer 43 may include any of various I/O devices as will be recognized by those of ordinary skill in the art such as a screen 44, a keyboard (which may be provided as part of a touch screen), input buttons 46 or switches, a mouse or joystick (not shown), speakers (not shown), and various I/O ports (not shown). The communications modules of the robotic navigation system 40 of FIGS. 4A-4C may include circuit boards configured to facilitate wired or wireless electronic communication (e.g., over a wireless local area network). The communications modules generally facilitate communications between the various panels and devices of the robotic navigation systems including communications between two or more of the I/O devices, the handheld navigation unit 50, the user interface 41, the robot control interface panel 42, and the robot controller 11.

Handheld Navigation Device

The handheld navigation unit 50 is in electronic communication with the electronic control unit 42, and also includes at least one communication module configured to facilitate such communication. In at least one embodiment, the handheld navigation unit 50 is in wireless communication with the electronic control unit 42 and completely releasable from the housing of the electronic control unit 42 without wires or cords extending between the handheld navigation unit 50 and the electronic control unit 42.

With reference now to FIGS. 5-8, the handheld navigation unit 50 is configured to be easily manipulated by a human hand. The handheld navigation unit 50 includes an upper portion in the form of a knob 52 that is pivotably connected to a lower base 54 with a yoke 56 extending between the knob 52 and the base 54. The knob 52 includes a generally flat upper surface 60, a generally straight front side surface 62, an arced rear side surface 64, and two parallel lateral side surfaces 66, 68. The knob 52 is about the size of a human palm and is designed and dimensioned to fit comfortably within a human hand. Accordingly, a user may grasp the knob with his or her thumb and little finger touching the two parallel lateral side surfaces 66, 68, and the tips of the remaining fingers on or near the front side surface 62. The user's palm is designed to rest on or near the arced perimeter of the rear side surface 64. While the upper portion of the handheld navigation unit 50 has been described herein as being a knob 52, it will be recognized that the upper portion may also be provided in other forms, such as a stick (e.g., a joystick), a mouse, or any other control device configured to be grasped and manipulated by a human hand. In at least one embodiment, the knob 52 is fixedly connected to the yoke 56, such that movement of the knob results in movement of the yoke 56, and the yoke is pivotable with respect to the base (as described in further detail below with reference to FIG. 9). While the yoke 56 may be moveable with respect to the base 54, the yoke is nevertheless retained by the base such that the knob is 52 non-removable from the base 54. In other embodiments, the yoke 56 may be stationary with respect to the base, and the knob 52 may be moveable with respect to the yoke. The term "handheld navigation unit" as used herein refers to a navigation unit that is configured to be manipulated by movement of a human hand, whether or not the housing for the handheld navigation unit is carried by the human or is stationary with respect to the human.

As described above, the knob 52 of the handheld navigation unit is pivotably connected to the base 54. The base 54 is sized and shaped similar to the knob 52, but the rear side surface of the base 54 is generally straight, while the front side surface of the base is generally arced. The base 54 may also include one or more buttons 58, which may serve as function buttons. In at least one embodiment, a button 63 is provided along the front surface 62, and this button 63 serves as an enable button for the handheld navigation unit 50. In particular, the button 63 must be depressed by the user before the robotic navigation system 40 will allow movement of the handheld navigation unit 50 to control the robot 10. Accordingly, the button 63 provides a safety feature, and is hard wired to the robot's safety circuit (via a programmed safety controller on the robot control interface panel 42).

Figure 8:
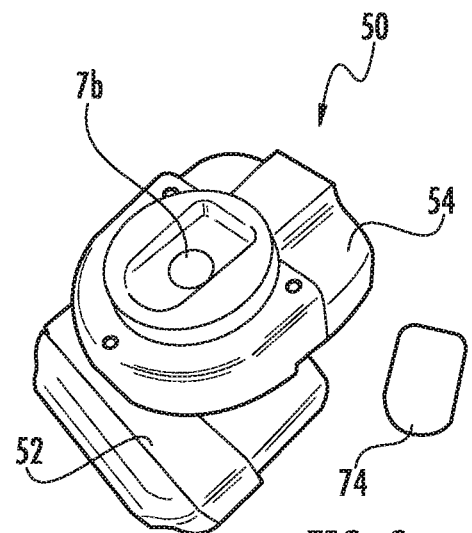
FIG. 8 shows a bottom perspective view of the handheld navigation unit of FIG. 5.
Figure 7:
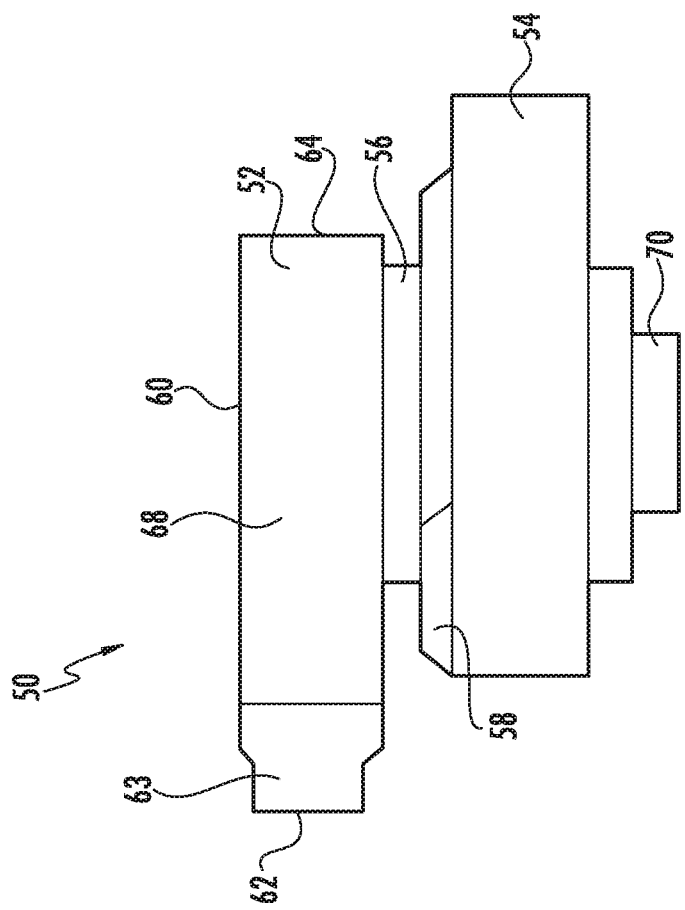
FIG. 7 shows a side plan view of the handheld navigation unit of FIG. 5.
Figure 6:
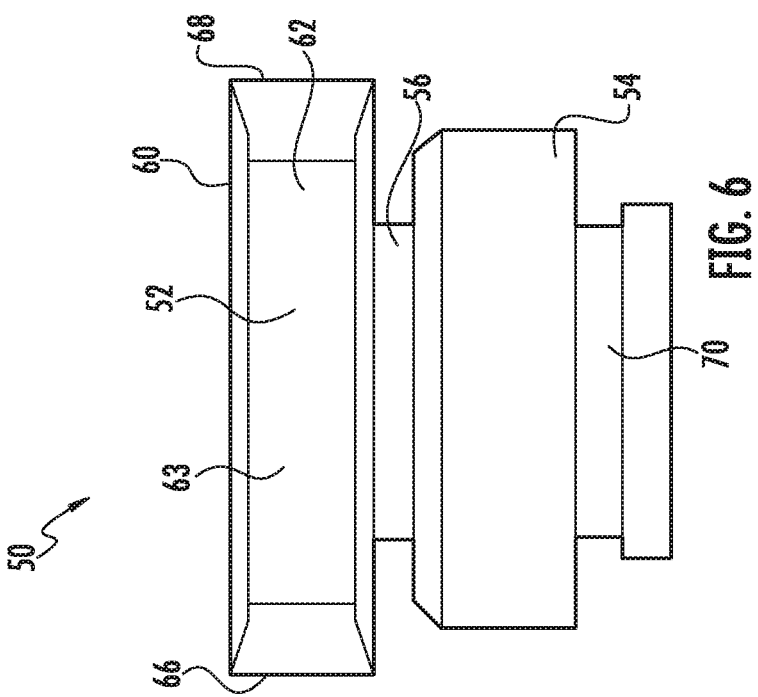
FIG. 6 shows a front plan view of the handheld navigation unit of FIG. 5.

A mount 70 is included at the bottom of the base 54. The mount 70 is configured to fit within a seat on the housing 48 of the electronic control unit 42 allowing the base 54 to be retained by the housing 48 of the electronic control unit 42. The mount also allows the base to be seated at other locations in the robot work cell, or on the robot arm. To this end, the bottom side of the mount 70 includes a cavity 72 with a releasable insert 74, as shown in FIG. 8. A magnet 76 or other mounting feature may be retained in the cavity 72. The insert 74 may be released from the cavity 72, as shown in FIG. 8, exposing the magnet 76 within the cavity 72. The cavity 72 is designed and dimensioned to engage one or more mounting features 78 (which may also be referred to herein as "mounting members") provided on the robot. For example, in FIG. 1 an exemplary mounting feature 78 is provided on the linkage 14 of the robot 10. In at least one embodiment, each mounting feature 78 is a mounting block having a box-like structure with an outer surface that is complimentary in shape to the cavity 72 such that the mounting feature 78 fits within and fills a substantial portion of the cavity 72. The mounting feature 78 may also include a magnet that is an opposite polarity from the magnet 76 on the handheld navigation unit 50. Alternatively, the mounting feature may simply include a piece of ferrous material, such as steel, such that a magnetic attraction is established between the magnet 76 and the mounting feature 78. Because the mounting feature 78 is attracted to the magnet 76, a magnetic force is established between the mounting feature 78 and the magnet 76, and this secures the base 54 of the handheld navigation unit 50 to the mounting feature on the robot 10. Furthermore, because the magnets are releasable from one another, the handheld navigation unit 50 is releasable at each of the selected mounting locations having a mounting feature 78 fixed thereto. While the magnetic attraction between the magnet 76 and the mounting feature 78 is sufficiently strong to mount the handheld navigation unit 50 on the mounting feature 78, it should be noted that the magnetic attraction is sufficiently weak such that the handheld navigation unit 50 will break away if the human operator lurches away or if the robot quickly and the navigation unit is left behind. In these cases, no damage occurs to the unit, as there is not tearing or ripping of the mount between the handheld navigation unit 50 and the mounting feature 78. Additional functionality provided by these selected mounting locations is provided in further detail below.

Movement of the Knob of the Handheld Navigation Unit

As discussed above, the knob 52 is moveable with respect to the base 54 of the handheld navigation unit 50. In at least one embodiment, the knob 52 is configured to move about any of six axes to provide the user with the ability to control the robot and move a robot tip and an associated device (e.g., a tool) held at the robot tip to any location within reach of the robot and with any orientation of the held device. FIGS. 9A-9F illustrate this six-direction movement of the knob. While the yoke 56 is shown in FIGS. 9A-9F, it will be appreciated that the yoke may be fixedly connected to the knob 52 such that movement of the knob along any of the illustrated directions also results in movement of the yoke 56.

Figure 9C:
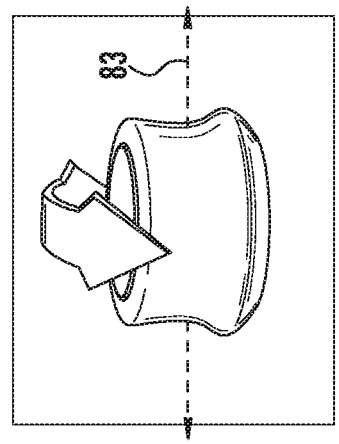
FIGS. 9A-9F show six axis control instructions possible with the handheld navigation unit of FIG. 5.
Figure 9F:
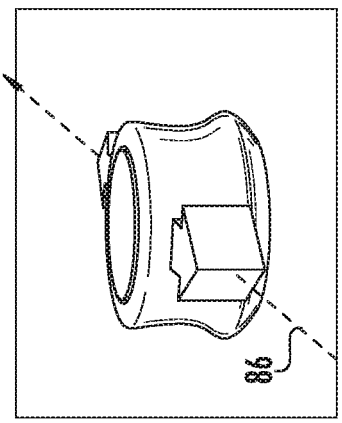
Figure 9B:
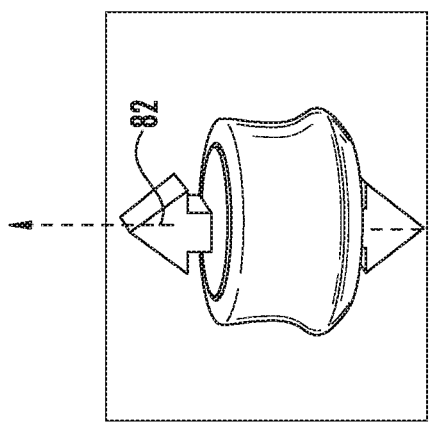
Figure 9E:
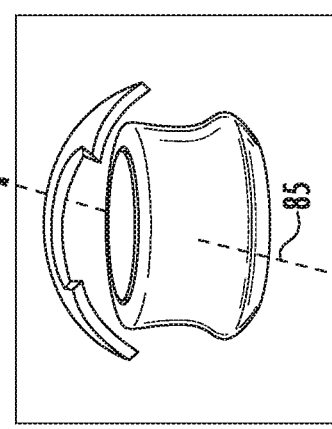
Figure 9A:
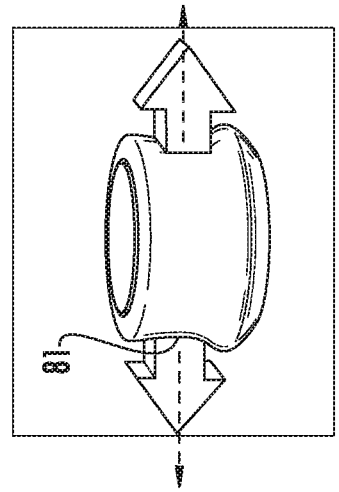

FIG. 9A shows that the yoke 56 may be manipulated by the user in a linear manner along an X-axis 81. Movement of the knob 52 and the attached yoke 56 along this X-axis 81 results in a control signal that causes the robot to move the robot tip along the X-axis in the direction indicated by the user along the selected reference frame's coordinate system.

FIG. 9B shows that the yoke 56 may be manipulated by the user in a linear manner along a Z-axis 82. Movement of the knob 52 and the attached yoke 56 along this Z-axis 82 results in a control signal that causes the robot to move the robot tip along the Z-axis in the direction indicated by the user along the selected reference frame's coordinate system.

FIG. 9C shows that the yoke 56 may be manipulated by the user by rotating the yoke 56 about a pitch-axis 83 (which is the same as the X-axis 81). Rotation of the knob 52 and the attached yoke 56 about this pitch-axis 83 results in a control signal that causes the robot to change the pitch of the robot tip about the pitch-axis in the direction indicated by the user along the selected reference frame's coordinate system.

Figure 9D:
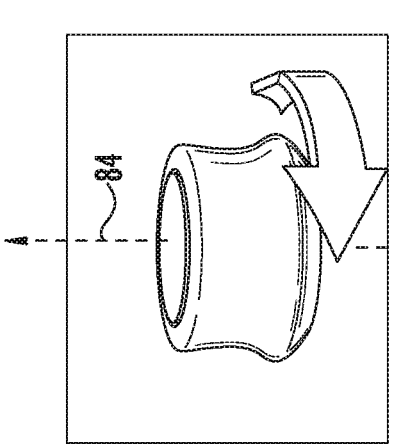

FIG. 9D shows that the yoke 56 may be manipulated by the user by rotating the yoke about a yaw-axis 84 (which is the same as the Z-axis 82). Rotation of the knob 52 and the attached yoke 56 about this yaw-axis 84 results in a control signal that causes the robot to change the yaw of the robot tip about the yaw-axis in the direction indicated by the user along the selected reference frame's coordinate system.

FIG. 9E shows that the yoke 56 may be manipulated by the user by rotating the yoke about a roll-axis 85. Rotation of the knob 52 and the attached yoke 56 along this roll-axis 85 results in a control signal that causes the robot to change the roll of the robot tip about the roll-axis in the direction indicated by the user along the selected reference frame's coordinate system.

FIG. 9F shows that the yoke 56 may be manipulated by the user in a linear manner along a Y-axis (which is the same as the roll-axis 85). Movement of the knob 52 and the attached yoke 56 along this Y-axis results in a control signal that causes the robot to move the robot tip along the Y-axis in the direction indicated by the user along the selected reference frame's coordinate system.

Electronic circuitry is housed within the base 54 of the handheld navigation unit 50 and is configured to detect movement of the knob 52 (and/or the attached yoke 56) relative to the base and translate such movement into control signals. In particular, the electronic circuitry housing in the base 54 senses human pushes along the X-Y-Z axes and rotation about the roll, pitch, yaw axes. Accordingly, movement of the knob 52 results in as many as six unique control signals, and these control signals are filtered and used in calculations to deliver to the robot to control movement of the robot. In particular, these six control signals allow the user to move the robot tip and an associated device to a point in space X-Y-Z and rotate the robot tip and the associated device about the X-Y-Z axes in any direction. When six directional movement like this is provided, six motors are typically required to do this, the kinematics of the 6 motors and linkages allow positioning of the robot in 6 axis space.

Movement of the knob 52 of the handheld navigation device 50 will generally define a number of different movement components, including a direction vector component, a rotational component, and a speed component. The direction vector component will be defined based on movement of the knob 52 relative to the X-Y-Z axes (e.g., 81, 86, 82 in FIGS. 9A-9C). The rotational component will be defined based on movement of the knob 52 relative to the roll, pitch and yaw axes (e.g., 85, 83, 84 in FIGS. 9A-9C). The speed component will be defined based on the force (distance) in which the user moves the knob 52 in the desired direction. As explained in further detail below, the user may place limitations on movements of the robot 10 (e.g., exclude movement along one axis or limit the speed of movement). Movement of the handheld navigation device 50 to provide one or more of a vector component, rotational component and a speed component for the robot may be referred to herein as a "commanded movement".

It will be appreciated that while six-directional movement has been described herein, movement of the robot 10 based on movement of the knob 52 of the handheld navigation device 50 will depend on the frame of reference for the handheld navigation device 50. The robotic navigation system 50 is configured to control the robot 10 from at least three different frames of reference including (1) a world coordinate frame of reference, (2) a tool coordinate frame of reference, or (3) a fixed tool frame of reference. Accordingly, the robotic navigation system includes at least three different modes in which the robot may be controlled, including (1) the world coordinate mode, (2) the tool coordinate mode, or (3) a fixed/remote tool mode. Each of these three modes is explained in further detail below. In each of these modes, the robotic navigation system 40 is configured to control the robot 10 based on (i) a frame of reference for the handheld navigation device 50 and (ii) a point of interest relative to the mounting flange 18 of the robot 10. The point of interest is generally a point in the coordinate system wherein a target movement of the robot 10 is determined based on the point of interest. The point of interest may be, for example, a tool coordinate (i.e., a point on the tip of a tool held by the robot 10, the tool coordinate defined by a set of coordinates relative to the mounting flange of the robot). A common tool coordinate may be, for example, the tip of a paint sprayer.

World Coordinate Mode

Figure 1:
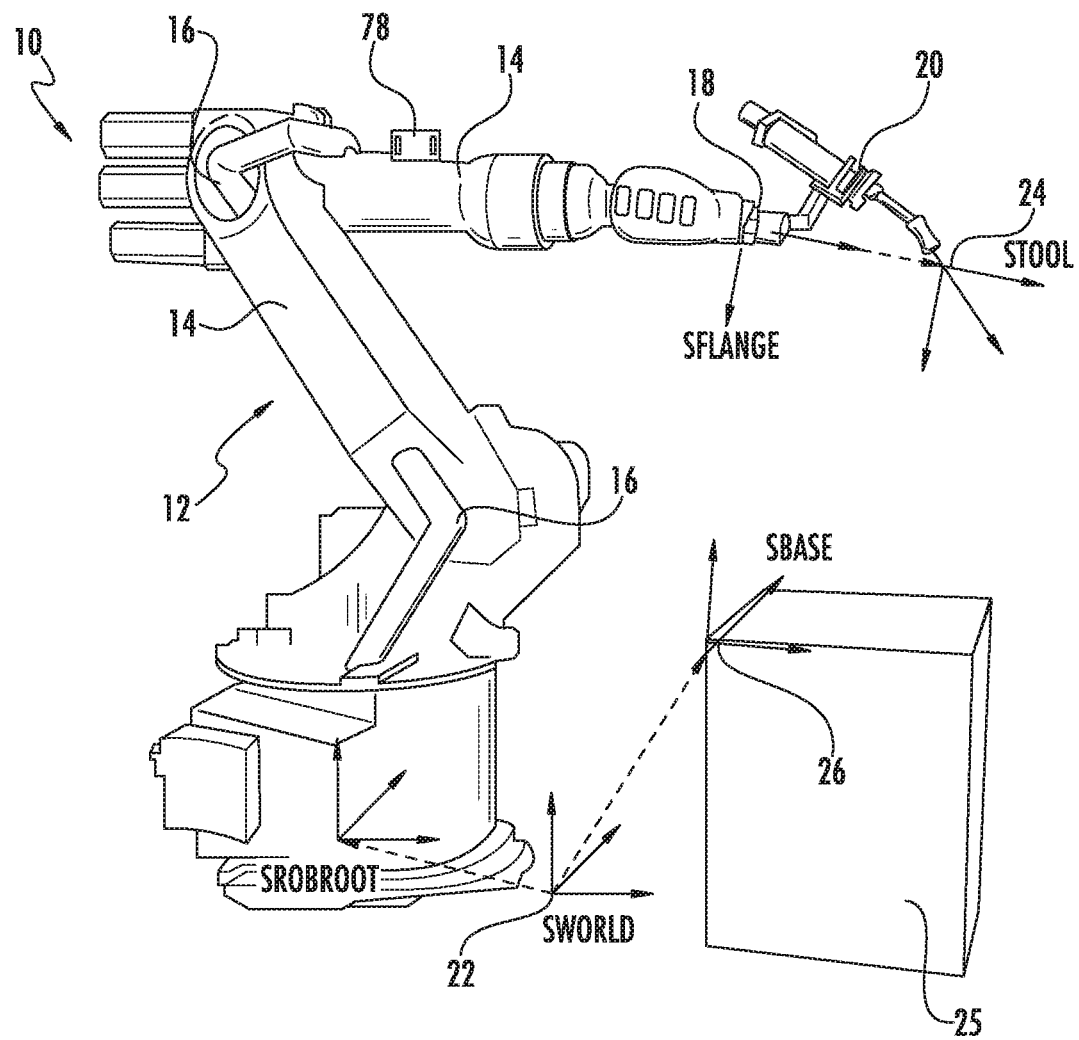
FIG. 1 shows an articulating robot used in association with a robotic navigation device.
Figure 2A:
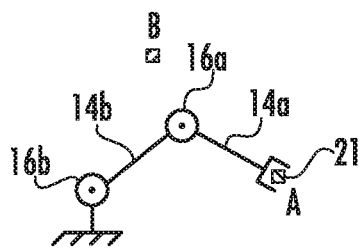
FIGS. 2A-2C show an exemplary circular movement path of the articulating robot of FIG. 1.
Figure 2B:
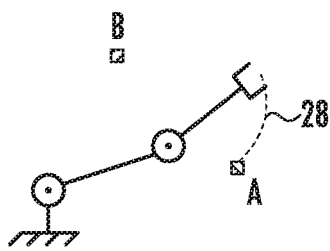
Figure 2C:
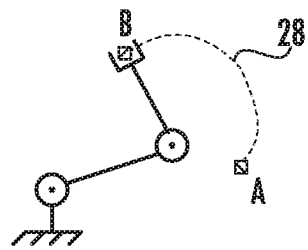
Figure 3A:
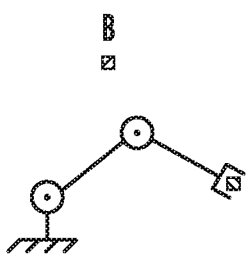
FIGS. 3A-3C show an exemplary linear movement path of the articulating robot of FIG. 1.
Figure 3B:
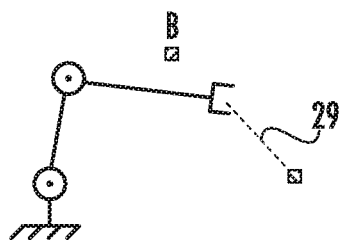
Figure 3C:
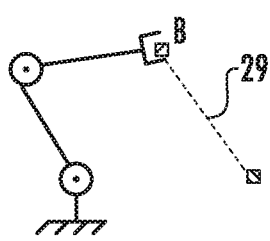

In the world coordinate mode, the frame of reference for the handheld navigation unit 50 is fixed and the point of interest is also fixed. The frame of reference in the world coordinate mode is typically defined by the axes intersecting at the zero point of the frame of reference, which zero point is defined by the center point at the bottom of the robot mount. In this mode, the handheld navigation unit 50 is typically secured to some fixed location with the plurality of axes (see FIG. 9) for the handheld navigation unit 50 aligned with the world coordinates. With reference to FIG. 1, the handheld navigation unit 50 may be located on the platform 25, with the X-Y-Z axis for the handheld navigation unit aligned with the base coordinates 26, which are simply a translation of the world coordinates 22. The point of interest in the world coordinate mode is the mounting flange 18 of the robot 10. The navigation unit 50 can be positioned in any orthogonal direction relative to the world coordinates, and the system will use the relative coordinate frame so the motion of the robot 10 is intuitive for the user based on the orientation of the navigation unit 50.

Figure 10:
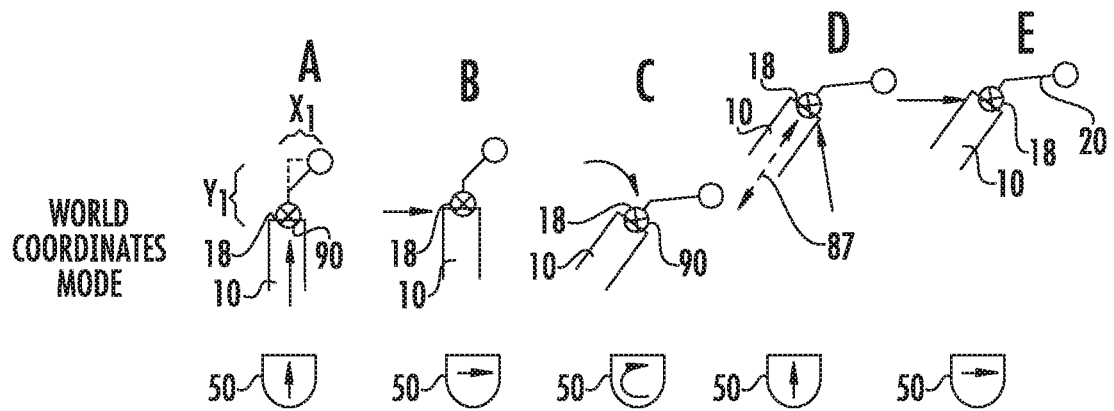
FIG. 10 is a diagram illustrating movement of a robot receiving control signals from the robotic navigation system of FIG. 4A operating in a world coordinates mode.

FIG. 10 illustrates movement of the handheld navigation unit 50 and the associated movement of the robot 10 in the world coordinates mode. FIG. 10 shows five positions of the mounting flange 18 of the robot 10, with these five positions designated positions A-E. A point of interest 90 is shown in FIG. 10 for each of these positions. The point of interest 90 is the mounting flange 18. World coordinate motion can also use a tool tip location as its point of interest.

As shown by position A in FIG. 10, the handheld navigation unit 50 is removed from the robot 10 and is oriented in the world coordinates frame of reference 22. If the user moves the knob 52 of the handheld navigation device 50 in a forward direction relative to the zero point in the base coordinates frame of reference, the robot will move in a similar manner to move the desired point of interest 90 in the indicated direction. As noted previously, movement of the handheld navigation device 50 will have a direction vector component, a rotational component, and a speed component. In the example of position A of FIG. 10, the direction vector component is directly along the y-axis (see FIG. 9F), the rotational component is null, and the speed component is some magnitude (which is unimportant for the illustration of FIG. 10). In response to this movement of the handheld navigation device 50, the robotic navigation system 40 calculates a new target position and orientation for the mounting flange 18 and the associated point of interest 90 (note that because the point of interest 90 is simply a coordinate translation from the mounting flange 18, movement of the mounting flange 18 also results in the desired movement of the point of interest 90). After calculating the new target position, the robotic navigation system 40 sends control signals to the robot 10 that cause the robot to move in a manner that results in the mounting flange 18 and the associated point of interest 90 moving in the desired direction to the new target position. In the case of position A of FIG. 10, the robot 10 moves such that the point of interest 90 is moved in the forward direction in the world coordinates frame of reference. This movement of the point of interest 90 is noted by the forward arrow pointing to the point of interest 90 at position A.

As shown by position B in FIG. 10, if the user moves the knob 52 of the handheld navigation device 50 in a lateral direction (i.e., along the x-axis as shown in FIG. 9A), the robot 10 will move such that the mounting flange 18 moves in the lateral direction in the world coordinates frame of reference. This movement of the mounting flange 18 also results in the point of interest 90 moving in the lateral direction in the world coordinates frame of reference, as noted by the lateral arrow at position B.

As shown by position C in FIG. 10, if the user rotates the knob 52 of the handheld navigation device 50 in a clockwise direction (i.e., about the yaw-axis as shown in FIG. 9B), the robot 10 will move such that the mounting flange 18 moves in a clockwise direction in the world coordinates frame of reference. This movement of the mounting flange 18 also results in the point of interest 90 moving in the clockwise direction, as noted by the lateral arrow at position C.

As shown by position D in FIG. 10, after the mounting flange has been rotated in the clockwise direction, if the user moves the knob 52 of the handheld navigation device 50 in a forward direction (i.e., along the y-axis as shown in FIG. 9F), the robot 10 will move such that the mounting flange 18 moves in the forward direction in the world coordinates frame of reference. This movement of the mounting flange 18 also results in the point of interest 90 moving in the forward direction in the world coordinates frame of reference, as noted by the forward arrow at position D. It should be noted that the linkage of the robot including the mounting flange 18 is not moved forward relative its own frame of reference (i.e., the mounting flange does not move along axis 87), but instead moves in a forward direction (i.e. along the x-axis as shown in FIG. 9F) within the world coordinates frame of reference.

Finally, as shown by position E in FIG. 10, if the user moves the knob 52 of the handheld navigation device 50 in a lateral direction (i.e., along the x-axis as shown in FIG. 9A), the robot 10 will move such that the mounting flange 18 moves in the lateral direction in the world coordinates frame of reference. This movement of the mounting flange 18 also results in the point of interest 90 moving in the lateral direction in the world coordinates frame of reference, as noted by the lateral arrow at position E.

Based on the foregoing example of FIG. 10, it will be recognized that in the world coordinate mode, the frame of reference for movement of the robot 10 never changes, as it is always based on the world zero point. Accordingly, linear and rotational movements are always based on the world zero point, and the tool coordinates are not required for any target calculations. It should also be noted that the movements do not need to be singular axis. Any combination of all six axis of motion by the handheld navigation unit 50 allows for fluid six-axis motion by the robot 10. Movement of the handheld navigation unit 50 results in a six-axis vector comprised of 6 directional magnitudes which results in the motion of the robot 10 based on this six-axis vector. This is similar to a flying airplane taking a corner, wherein the location and the attitude simultaneously change, in different magnitudes.

Tool Coordinate Mode

Figure 13:
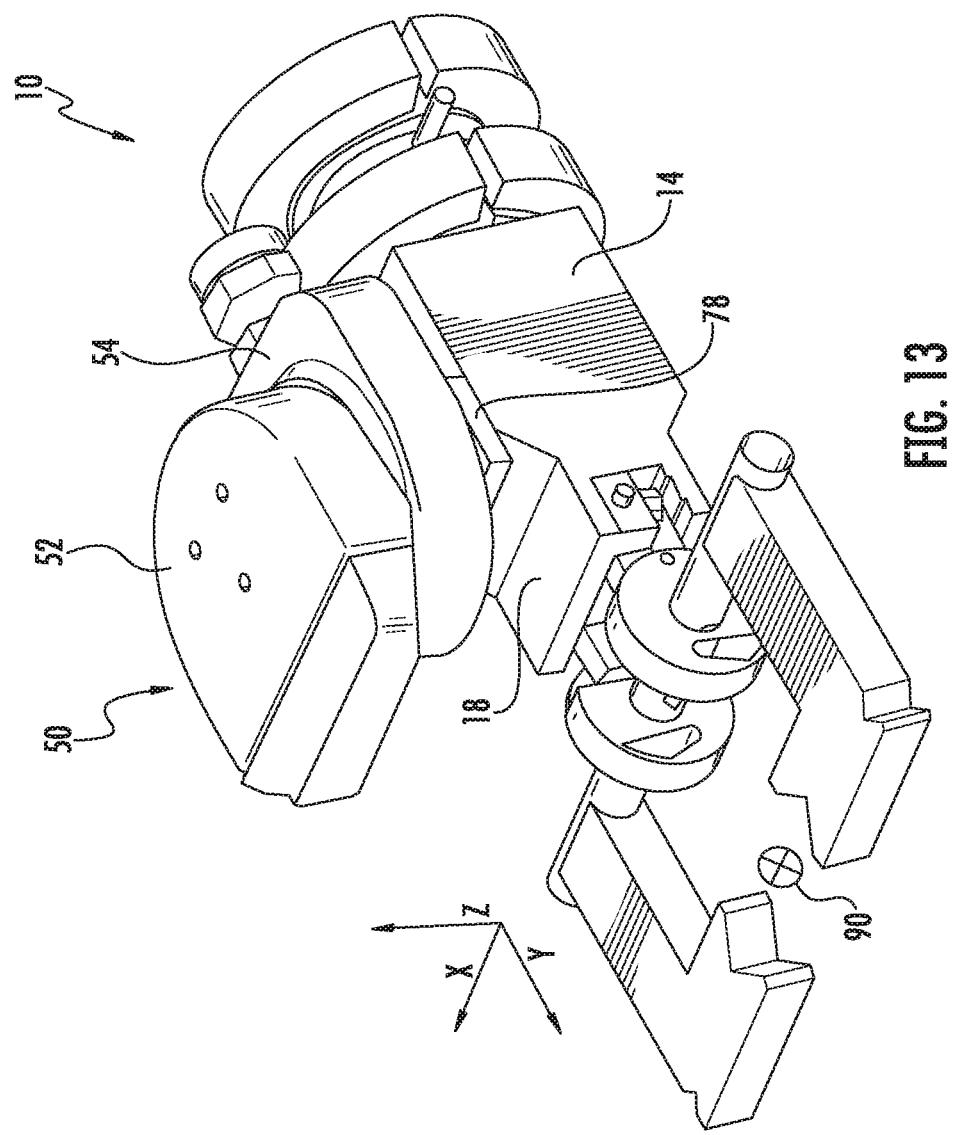
FIG. 13 shows a perspective view of the handheld navigation unit of FIG. 5 mounted on a robot arm.

In the tool coordinate mode, the handheld navigation unit 50 is moved to one of the mounting features 78 on the robot, and the location of the mounting feature, or a position in proximity of the mounting feature becomes the frame of reference for the handheld navigation unit 50. In this mode, the frame of reference for the handheld navigation unit 50 is dynamic relative to the world coordinates 22, and the frame of reference is associated with the position of the robot 10. For example, as shown in FIG. 13, if the handheld navigation unit 50 is attached to a mounting feature 78 adjacent to the mounting flange 18 of the robot 10, the zero point for the frame of reference for the handheld navigation unit 50 may be the base of the mounting feature 78 or some fixed distance therefrom (such as a point on the tip of the mounting flange 18). In this case, the axes of the frame of reference are aligned with the portion of the linkage 14 to which the mounting feature 78 is attached (e.g., the y-axis for the frame of reference may extend along the elongated linkage 14). The frame of reference in the tool coordinates mode is referred to herein as the "tool coordinates" frame of reference. In the tool coordinates mode, the frame of reference is such that the user is provided with the feeling of riding on the robot at the location of the mounting feature 78. In at least one embodiment, the zero point (which may also be referred to herein as the zero coordinate) for the tool coordinates frame of reference is simply the mounting flange 18. In any event, the zero point for the tool coordinates frame of reference is simply a translation from the world coordinates, which frame of reference moves relative to world coordinates with each movement of the robot 10.

The point of interest 90 in the tool coordinates mode is typically the tool coordinates, which are simply a fixed translation of the coordinates of the mounting flange 18 of the robot 10. As also shown in FIG. 13, in at least one embodiment, the point of interest/tool coordinates 90 is located directly forward from the mounting flange 18. However, it will be recognized that in at least some embodiments, the point of interest in the tool coordinates mode may be another location on the robot, such as a point on the mounting flange 18.

Figure 11:
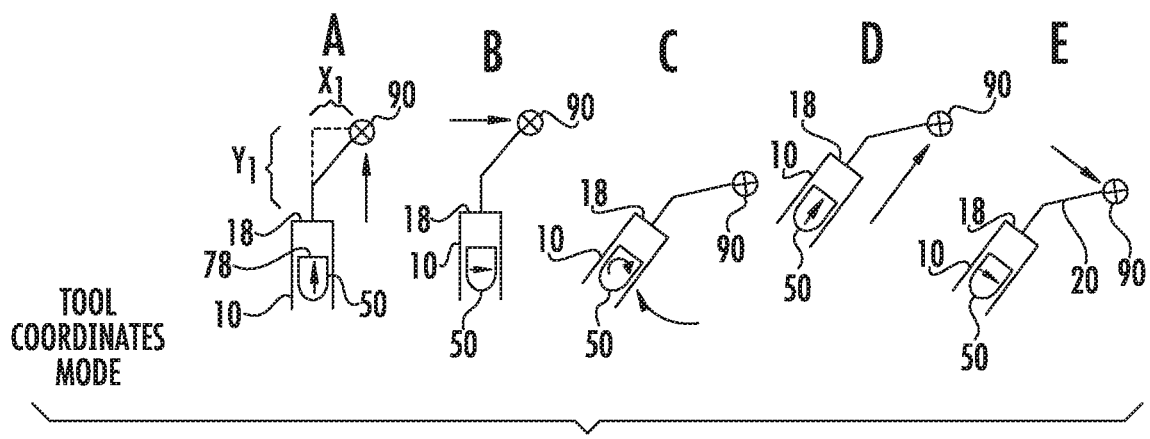
FIG. 11 is a diagram illustrating movement of a robot receiving control signals from the robotic navigation system of FIG. 4A operating in a tool coordinates mode.

FIG. 11 illustrates movement of the handheld navigation unit 50 and the associated movement of the robot 10 in the tool coordinates mode. FIG. 11 shows five positions of the mounting flange 18 of the robot 10, with these five positions designated positions A-E. A point of interest 90 is shown in FIG. 11 for each of these positions. The point of interest 90 is a tool coordinate, located at a fixed position relative to the mounting flange 18. The point of interest 90 is some point on a tool (e.g., a spray tip of a paint gun) or other device retained by the robot 10 which the user of the robotic navigation system 40 attempts to move in space to a desired location. In the example of FIG. 11, the tool coordinate is defined by the coordinate set $(x_1, y_1)$. This same tool coordinate set $(x_1, y_1)$ is constant for each of positions A-E.

As shown by position A in FIG. 11, the handheld navigation unit 50 is secured to a mounting feature 78 on the robot 10 and the frame of reference for the handheld navigation unit is the frame of reference for the mounting feature 78 (which may be, for example, the same frame of reference as the mounting flange 18). If the user moves the knob 52 of the handheld navigation device 50 in a forward direction (i.e., along the y-axis 86 in FIG. 9F) relative to the zero point of frame of reference, the robot 10 will move in a similar manner to move the desired point of interest 90 in the indicated direction within the tool coordinates frame of reference. In the case of position A of FIG. 10, the robot 10 moves such that the point of interest 90 is moved in the forward direction in the tool coordinates frame of reference. This movement of the point of interest 90 is noted by the forward arrow pointing to the point of interest 90 at position A.

As shown by position B in FIG. 11, if the user moves the knob 52 of the handheld navigation device 50 in a lateral direction (i.e., along the x-axis as shown in FIG. 9A), the robot 10 will move such that the mounting flange 18 moves in the lateral direction in the tool coordinates frame of reference. This movement of the mounting flange 18 also results in the point of interest 90 (i.e., the tool coordinates) moving in the lateral direction in the world coordinates frame of reference, as noted by the lateral arrow at position B.

As shown by position C in FIG. 11, if the user rotates the knob 52 of the handheld navigation device 50 in a clockwise direction (i.e., about the yaw-axis as shown in FIG. 9B), the robot 10 will move such that the mounting flange 18 in the clockwise direction about the point of interest 90 (i.e., the tool coordinates), as noted by the lateral arrow at position C. As shown in position C, after the mounting flange 18 has been rotated in the clockwise direction, the handheld navigation unit 50 which moves with the mounting flange has also been rotated in the clockwise direction upon the robot 10. Thus, while the frame of reference for the handheld navigation unit 50 remains the same relative to the mounting feature 78 of the robot 10 (i.e. the tool coordinate frame of reference), and while the tool coordinates remain the same (i.e., the point of interest 90 has not moved relative to the mounting flange 18), the tool coordinate frame of reference has changed relative to the world coordinate frame of reference.

As shown by position D in FIG. 11, after the point of interest 90 has been rotated in the clockwise direction, if the user moves the knob 52 of the handheld navigation device 50 in a forward direction (i.e., along the y-axis as shown in FIG. 9F), the robot 10 will move such that the mounting flange 18 moves in the forward direction in the tool coordinates frame of reference. This movement of the mounting flange 18 also results in the point of interest 90 (i.e., the tool coordinates) moving in the forward direction in the tool coordinates frame of reference, as noted by the forward arrow at position D. It should be noted that in the tool coordinate mode, direct forward movement of the handheld navigation unit 50 (i.e. movement along the x-axis as shown in FIG. 9F) only results in direct forward movement in the world coordinates frame of reference when the tool coordinate frame of reference is directly aligned with the world coordinate frame of reference.

Finally, as shown by position E in FIG. 11, if the user moves the knob 52 of the handheld navigation device 50 in a lateral direction (i.e., along the x-axis as shown in FIG. 9A), the robot 10 will move such that the mounting flange 18 and point of interest 90 (i.e., the tool coordinates) moves in the lateral direction in the tool coordinates frame of reference, as noted by the lateral arrow at position E.

Based on the foregoing example of FIG. 11, it will be recognized that in the tool coordinate mode, the frame of reference for movement of the robot 10 is aligned with and fixed to a point on the robot itself (e.g., the mounting flange 18). This frame of reference changes with each different mounting location (i.e., each location of a mounting feature 78). While this frame of reference is fixed relative to the location on the robot, the frame of reference changes with respect to the world coordinates. Movements of the robot are made to achieve the desired linear and rotational movements of the tool coordinates, and these tool coordinates are fixed in relation to the mounting flange. While each of the movements in FIG. 11 are shown as being along or about only a single axis for the sake of simplicity, it will be recognized that the handheld navigation device may be manipulated by the user to indicated simultaneous movement of the robot 10 along some portion of two or more axis (e.g., all six axes). In this mode, movement of the robot 10 is determined by forming a six-axis vector based on movement of the navigation device 50, where the movement of the navigation device 50 relative to each of six axes is translated into a movement vector for the robot with movement along each axis being simultaneous and with independent/different magnitudes.

The ability to mount the handheld navigation unit 50 in any of multiple locations/points on the robot 10 based on the locations of the various mounting features 78 makes the tool coordinates mode more intuitive and easy to learn for a user. While FIGS. 1 and 13 show two possible locations for the mounting feature 78 on the robot 10, it will be appreciated, that numerous other locations are also possible. Each time the handheld navigation unit is placed in a new location, a new frame of reference for the 6-axis feedback is established, and as explained above, this new frame of reference is used to translate a movement request into the desired motion of the robot 10. Accordingly, before a movement request from the handheld navigation unit may be processed, the robotic navigation system 40 must determine the frame of reference for the handheld navigation unit 50. Thus, the electronic control unit 42 associates each of the mounting features 78 with a mounting location and each mounting location with its own frame of reference. The location where the handheld navigation unit 50 is mounted may be determined automatically by the robotic navigation system, or may need to be specified by the user.

Figure 14:
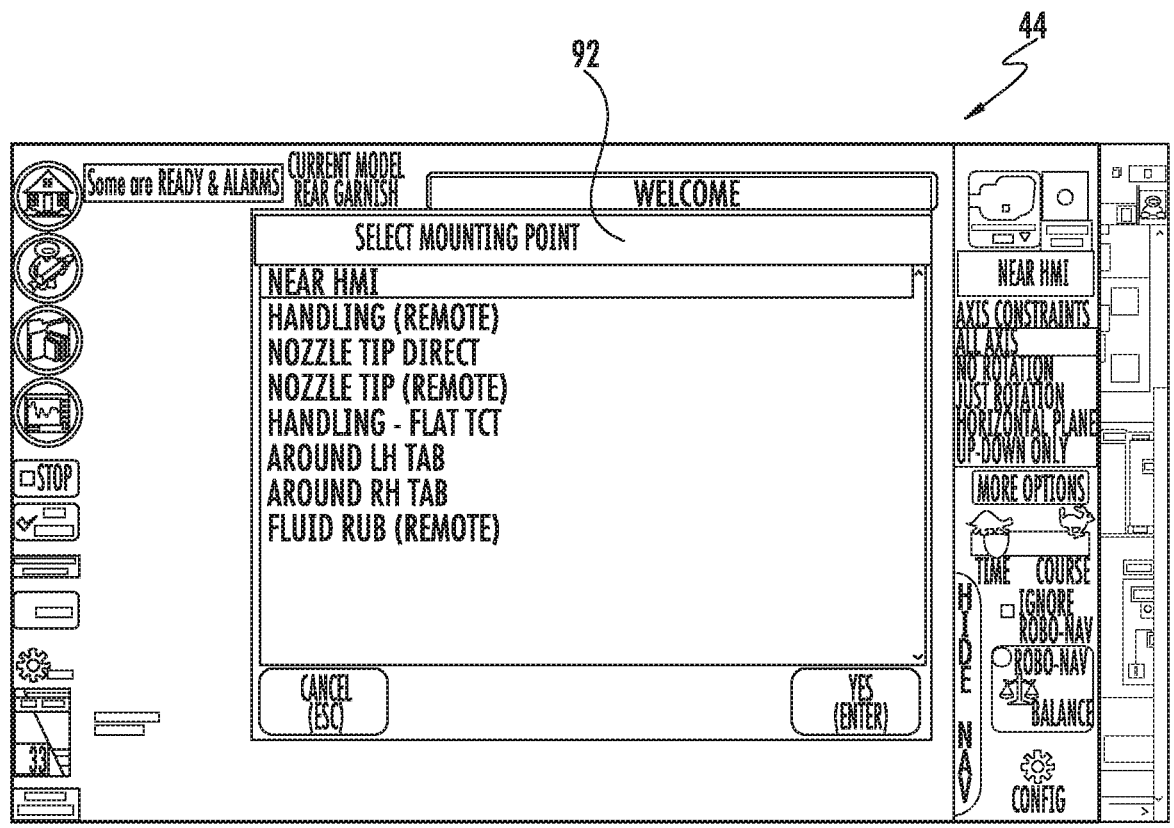
FIG. 14 shows a front view of a control screen of the robotic navigation system of FIG. 4A.

In at least one embodiment, the mounting features 78 have no identifier. In this embodiment, the user indicates to the electronic control unit 42 which mounting feature the handheld navigation device is mounted upon, and therefore, which reference frame of reference to use. FIG. 14 shows an exemplary screen shot of the screen 44 providing a menu 92 to the user. The menu 92 includes a list of eight different mounting points where a mounting feature is located. When the user selects one of these mounting points on the screen 44, the electronic control unit 42 uses the frame of reference associated with that mounting point when translating movement requests from the handheld navigation unit 50 into the desired motion of the robot 10.

In at least one alternative embodiment each mounting feature 78 includes a code or other identifier that may be read by the handheld navigation unit 50 and automatically sent to the electronic control unit 42 when the handheld navigation unit 50 is mounted on the mounting feature 78, thus informing the electronic control unit 42 of the location and frame of reference for signals sent from the handheld navigation unit 50. In at least one embodiment, the identifier is an RFID tag located at each mounting feature 78. In another alternative embodiment, the identifier is a resistor having a unique resistance, wherein the resistor is connected to a circuit in the handheld navigation unit 50 when the handheld navigation unit is placed on the mounting feature 78. In yet additional exemplary embodiments, the identifier may include image sensing devices such as a QR code (3D barcode), bar code (2D barcode), or binary sensor matrix.

Fixed/Remote Tool Mode

In the fixed/remote coordinate mode, the handheld navigation unit 50 may be either connected to one of the mounting features 78 on the robot or mounted remote from the robot. Accordingly, the fixed/remote mode includes two sub-modes, including a first sub-mode where the handheld navigation unit is mounted on one of the mounting features 78 of the robot 10, and a second sub-mode where the handheld navigation unit is mounted remote from the robot. Exemplary operation of the robot 10 in the first sub-mode is described with reference to FIGS. 12 and 15. Exemplary operation of the robot in the second sub-mode is described with reference to FIG. 16.

Figure 12:
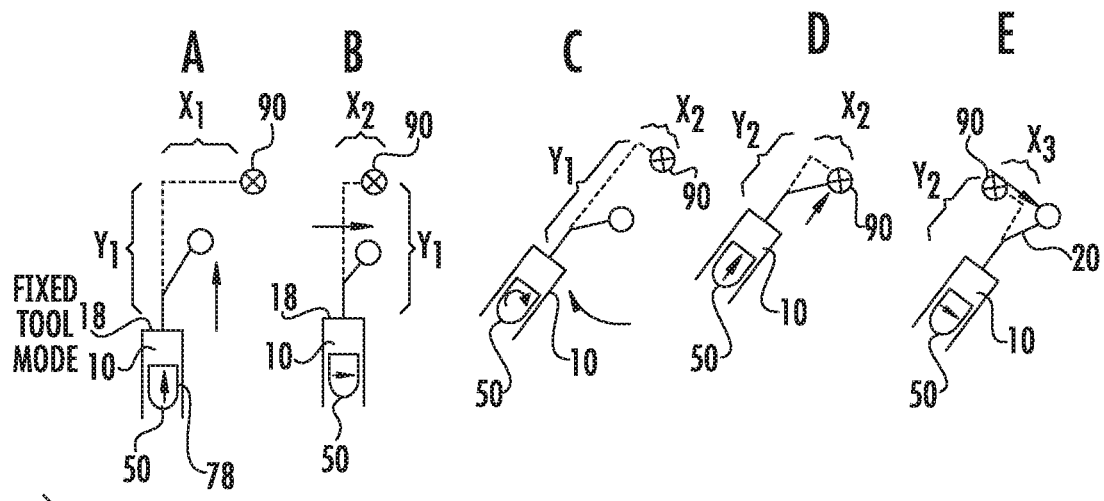
FIG. 12 is a diagram illustrating movement of a robot receiving control signals from the robotic navigation system of FIG. 4A operating in a fixed tool mode.

With reference now to FIG. 12, in the remote tool mode, the frame of reference for the handheld navigation unit 50 is a mounting feature 78 on the robot 10. The point of interest 90 in the remote tool mode is a point on a remote tool that is completely removed from the robot 90. The remote tool is typically a stationary tool having a fixed location relative to the robot 10. However, unlike the world coordinates mode and the tool coordinates mode, in the remote tool mode, the point of interest 90 is actually moveable relative to the robot.

FIG. 12 illustrates movement of the handheld navigation unit 50 and the associated movement of the robot 10 in the remote tool mode. FIG. 12 shows five positions of the mounting flange 18 of the robot 10, with these five positions designated positions A-E. A point of interest 90 is shown in FIG. 12 for each of these positions. The point of interest 90 is a fixed position on a stationary tool that is separate from the robot. The point of interest 90 may be some point on a rotary tool (e.g., a de-burring shaft), spray tool, or any of various other tools. In the example of FIG. 12, the point of interest is removed from the mounting flange (zero point) by a distance defined by the coordinate set $(x_1, y_1)$. However, as will be explained in further detail below, this point of interest coordinate set $(x_1, y_1)$ is different with each movement of the robot along positions A-E.

As shown by position A in FIG. 12, the handheld navigation unit 50 is secured to a mounting feature 78 on the robot 10 and the frame of reference for the handheld navigation unit is the frame of reference for the mounting flange 18. If the user moves the knob 52 of the handheld navigation device 50 in a forward direction (i.e., along the y-axis 86 in FIG. 9F) relative to the zero point of the frame of reference, the robot 10 will move in a similar manner to move the mounting flange 18 in the indicated direction as indicated by the arrow in the position A diagram. However, when the mounting flange 18 moves, the point of interest 90 remains stationary in the remote tool mode. Thus, movement of the mounting flange 18 results in a change in the distance between the mounting flange 18 and the point of interest 90, which changes the assigned coordinates for the point of interest relative to the robot flange. For example, in position A, the assigned coordinates are shown as $(x_1, y_1)$, while in position B, the assigned coordinates are $(x_2, y_1)$.

Position B of FIG. 12 shows that, if the user moves the knob 52 of the handheld navigation device 50 in a lateral direction (i.e., along the x-axis as shown in FIG. 9A), the robot 10 will move such that the mounting flange 18 moves in the lateral direction toward the point of interest 90 (i.e., $x_1 > x_2$), as noted by the lateral arrow at position B. Thus, because the mounting flange 18 is closer to the point of interest 90 new coordinates are assigned to the point of interest following the movement to position B.

As shown by position C in FIG. 12, if the user rotates the knob 52 of the handheld navigation device 50 in a clockwise direction (i.e., about the yaw-axis as shown in FIG. 9B), the robot 10 will move the mounting flange 18 in the clockwise direction, rotating about the point of interest 90. This rotational movement of the robot 10 relative to the point of interest 90 does not change the assigned x-y-z coordinates (only x and y coordinates are shown in FIG. 12 for the sake of simplicity, and the assigned coordinates remain $(x_2, y_1)$ of the robot flange relative to the point of interest following the movement of position C. However, it will be recognized that attitude coordinates (i.e., roll, pitch, yaw) will change with rotational movement of the handheld navigation device 50 and the associated rotational movement of the robot 10.

As shown by position D in FIG. 12, after the mounting flange 18 has been rotated in the clockwise direction about the point of interest 90, if the user moves the knob 52 of the handheld navigation device 50 in a forward direction (i.e., along the y-axis as shown in FIG. 9F), the robot 10 will move such that the mounting flange 18 moves in the forward direction toward the point of interest 90, as noted by the arrow at position D. This movement of the mounting flange 18 results in the assigned coordinates for the point of interest 90 moving once again. In particular, the newly assigned coordinates for the point of interest become $(x_2, y_2)$, with $y2<y_1$. In this position D, the resulting coordinates for the tip of the tool 20 connected to the mounting flange 18 are nearly the same as the coordinates for the point of interest 90.

Finally, as shown by position E in FIG. 12, if the user moves the knob 52 of the handheld navigation device 50 in a lateral direction (i.e., along the x-axis as shown in FIG. 9A), the robot 10 will move such that the mounting flange 18 moves in the lateral direction away from the point of interest 90, resulting in a new set of coordinates for the point of interest (i.e., $(x_3, y_2)$). In this case $x_3$ is actually an opposite value from $x_1$, as the mounting flange was to the left of the point of interest with $x_1$ and the mounting flange is to the right of the point of interest with $x_3$.

As shown from the example of FIG. 12, in the remote tool mode, manipulation of the robot is made with respect to a point in space that is remote from the robot (e.g., consider rotation about the point of interest 90 in position C of FIG. 12). Each time the robot moves a predetermined incremental amount (as defined by the system), the robot's frame of reference, distance and attitude from the point of interest on the remote tool shifts. Accordingly, each small move by the robot then requires a new re-calculation of the reference frame. This reference frame may be defined by a straight line from the tip of the remote mounted tool (e.g., a spinning drill bit) to the center of the mounting flange of the robot. As discussed above coordinates for the point of interest can be provided to define this vector defining the reference frame. Each time the robot moves, the angle, and or distance of this vector changes. In this version of remote fixed tool where the navigation device is fixed to the robot, the movement is quite similar to tool coordinate mode for translation, but for rotation, the motion is unique, in that the point of rotation is fixed in space, not fixed relative to the robot flange.

The above-described unique frame of reference for movement of the robot provides several advantages for the user. First, the remote tool mode allows the user to manipulate the robot in a manner that makes the user feel as if he is manipulating about the fixed tool. Second, this remote tool mode allows the user to more intuitively use a tool while a part is held by the robot instead of a fixed part and robot held tool. Third, because the user has the advantage of a more intuitive manipulation of the robot with respect to a remote tool, manufacturing steps may be omitted. In particular, there is no need to have a first robot release a part, hold the part stationary, and then have a second robot move a tool relative to the stationary part. Instead, a robot that grabs a part may retain the part and simply move the part relative to a stationary tool. This action is uncommon in many industrial manufacturing environments. An example of the advantageous frame of reference provided by the remote tool mode is described now in further detail with respect to FIGS. 15 and 16.

Figure 15:
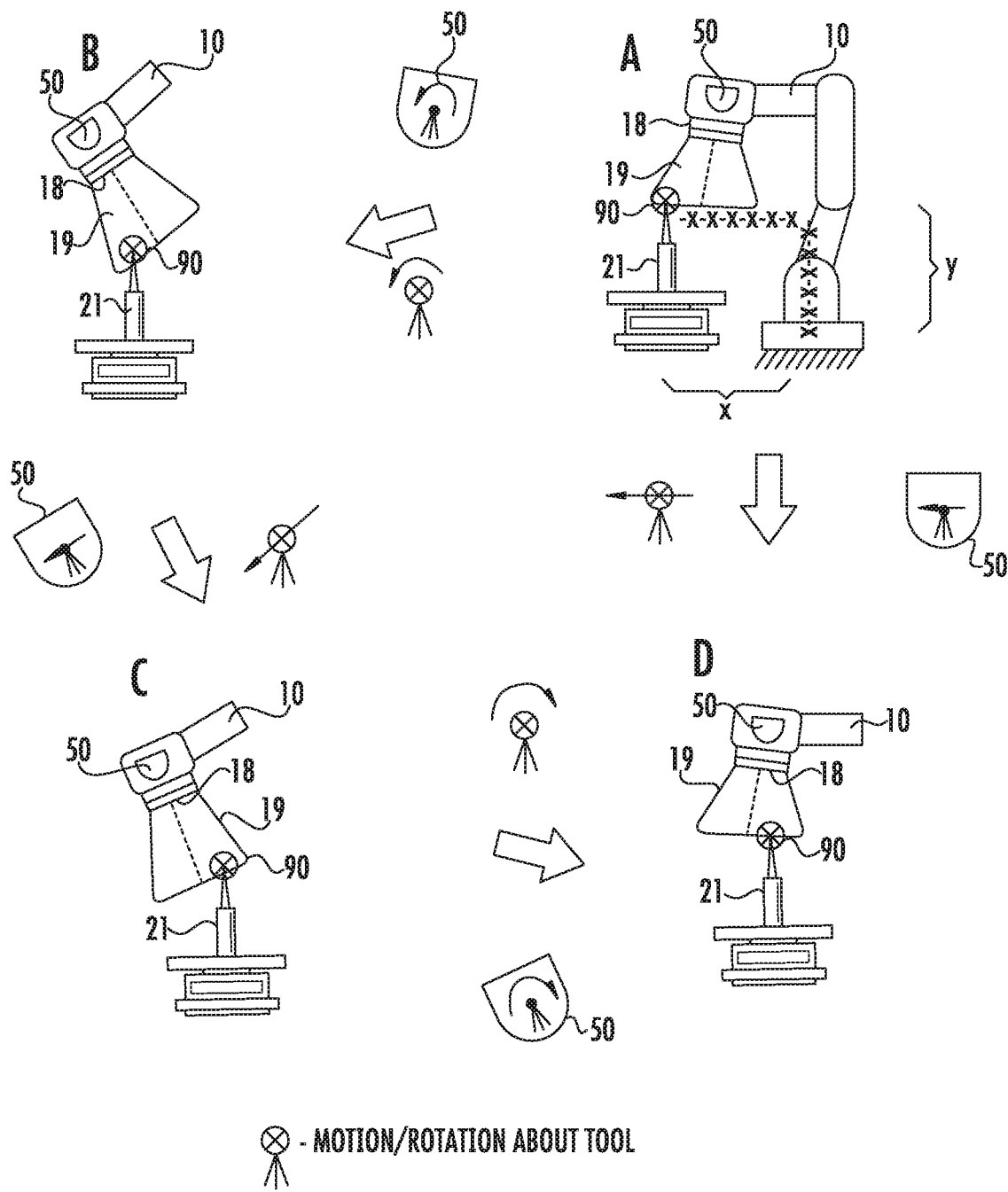
FIG. 15 is a diagram illustrating movement of a robotic arm relative to a fixed tool, the robotic arm controlled with the robotic navigation system of FIG. 4A in a robot frame of reference mode.

FIG. 15 shows an exemplary arrangement utilizing the first sub-mode for the remote tool mode. In this arrangement, the handheld navigation device 50 is positioned on a mounting feature of the robot 10 near the mounting flange 18, as shown at position A. As shown in FIG. 15, the robot 10 is holding a manufacturing part 19 in proximity to a stationary tool 21. The point of interest 90 is a tip of the stationary tool. As shown in the movements from position A-D of FIG. 15, rotation of the handheld navigation device 50 results in movement of the robot such that the part pivots about the point of interest 90. For example, in moving from position A to position B, the user rotates the knob of the handheld navigation device in a counter-clockwise direction. This results in the robot moving the mounting flange 18 such that the part 19 contacts the stationary tool 21 at the same location on the part 19, but the part 19 is pivoted about the point of interest 90. It will be recognized that this pivoting results in no change of the robot's mounting flange 18 x-y-z coordinates relative to the point of interest (which coordinates are noted to as the "tool coordinates" in the illustration of FIG. 15, described in further detail below). The resultant motion is much like tool coordinate rotation in FIG. 11-C, but the point of interest is used to mathematically generate the tool coordinate. It will also be recognized that this pivoting does result in a change in the attitude coordinates (i.e., roll, pitch, yaw) for the point of interest.

While rotation of the knob of the handheld navigation unit 50 does not change the assigned tool coordinates in the movement from position A to position B, the assigned tool coordinates do change when the handheld navigation unit 50 is moved in a linear direction. For example, as shown in the movement from position B to position C, movement of the handheld navigation unit in a lateral direction results in the point of interest 90 moving from one side of the part 19 to an opposite side of the part. Accordingly, the x-coordinate for the point of interest 90 has an opposite value in position C than in position B, since the point of interest is now on an opposite side of the mounting flange zero location. The movement illustrated from position A to position D shows a similar change in the tool coordinates when linear motion is requested by movement of the handheld navigation device 50.

The movement from position C to position D again illustrates the frame of reference for rotational movement of the robot in the remote tool mode. In particular, rotational movement of the handheld navigation device 50 results in movement of the robot 10 such that the part 19 pivots relative to the point of interest 90, but the part remains in contact with the stationary tool 21 at the same location. In this case, clockwise movement of the handheld navigation device results in clockwise rotation of the part 19 with rotation centered about the point of interest. Again, the rotational movement does not result in a change of the tool coordinates.

Figure 16:
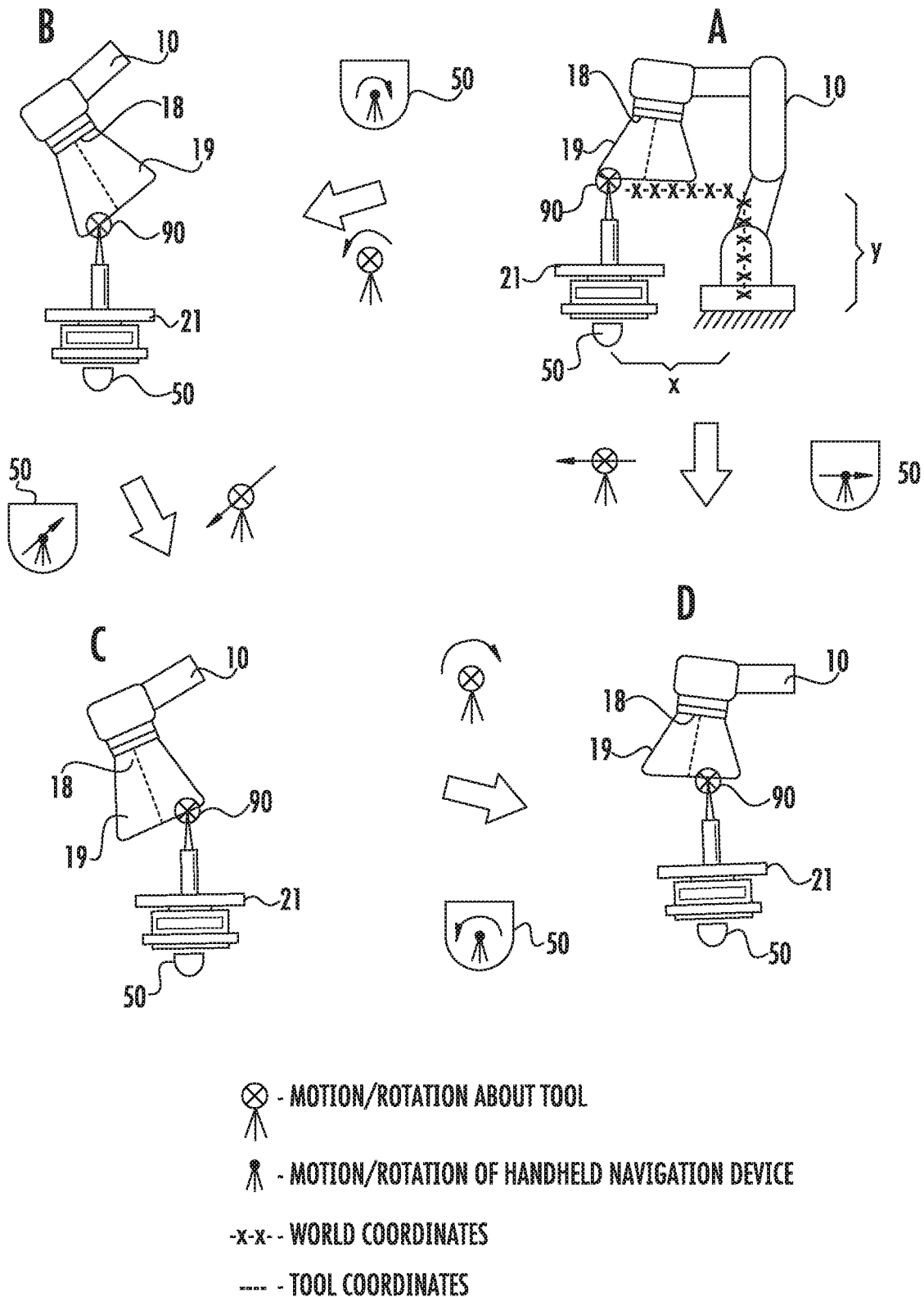
FIG. 16 is a diagram illustrating movement of a robotic arm relative to a fixed tool, the robotic arm controlled with the robotic navigation system of FIG. 4A in a fixed tool frame of reference mode.

With reference now to FIG. 16, an exemplary arrangement illustrating the second sub-mode for the remote tool mode is shown. In this arrangement, the handheld navigation device 50 is positioned at a fixed location near the remote tool 21 (e.g., at the base of the fixed tool). In this mode, the frame of reference allows the user to feel as if he is actually moving the stationary remote tool 21, even though the remote tool is fixed in place. It will be recognized that the movement of the robot in FIG. 16 from positions A-D are identical to the movements described above in FIG. 15. Also, identical to FIG. 15, rotational movements of the handheld navigation unit 50 in FIG. 16 do not change the tool coordinates for the remote point of interest 90 but linear movements of the handheld navigation device 50 do change the tool coordinates. As a result the tool coordinates are updated/reassigned with each linear movement of the handheld navigation device. However, FIG. 16 is different from FIG. 15 in that movements of the handheld navigation unit 50 in FIG. 16 are directly opposite those shown in FIG. 15, even though movement of the robot from position-to-position is the same. Accordingly, in this mode, the user moves the handheld navigation unit in the direction he or she desires to move the point of interest 90, and the robot makes the appropriate movements to provide the user with the perspective that he or she is actually moving the fixed point of interest 90. For example, in movement from position B to position C in FIG. 16, the user moves the handheld navigation device in a linear motion that is at an upward and rightward angle of approximately 45°. As a result, the position of the point of interest 90 moves along the part 19 at an upward and rightward angle of approximately 45°. Again, this gives the user the feeling that he or she is moving the remote tool even though the tool is stationary. This gives the user a more intuitive feel for controlling a robot that is holding a part to be manipulated by a remote tool.

Other Inputs for Handheld Navigation Device

Various frames of reference, mounting locations and movements for the handheld navigation unit 50 have been described above. It will also be appreciated that additional controls for the handheld navigation device 50 may be provided on both the device 50 and in the electronic control unit 42 (e.g., provided on the on the screen 44), examples of which are provided below.

Figure 17:
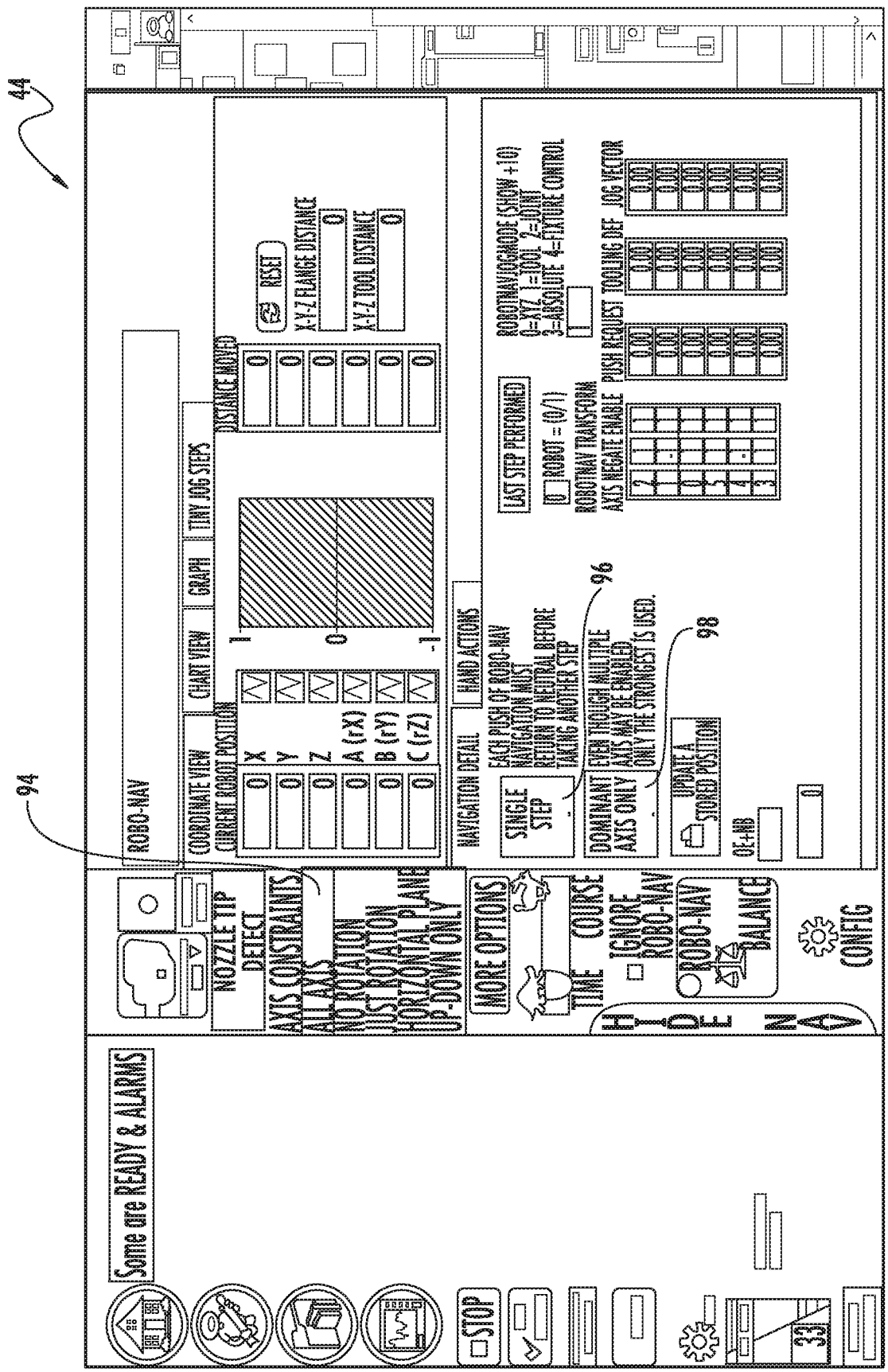
FIG. 17 shows a front view of a control screen of the robotic navigation system of FIG. 4A.

In at least one exemplary embodiment, as shown in the exemplary screen shot of FIG. 17, the user is provided with a number of movement controls including an axis constraint menu 94, a step button 96, and a dominant axis only button 98. The axis constraint menu 94 allows the user to select restrictions for movement. For example, if the user selects "no rotation" on the axis constraint menu, only movements along the X-Y-Z axis of the knob 52 will translate into robotic movement, and any inadvertent roll, pitch or yaw movements suggested by movement of the handheld navigation unit 50 will be ignored. The step button 96 is a toggle button that, when pressed, forces the user to move the knob 52 of the handheld navigation unit 50 for each desired incremental movement of the robot. When this step button 96 is depressed the knob 52 of the handheld navigation unit 50 must be returned to the neutral position before the robot takes another incremental step in the desired direction. When the dominant axis only button 98 is depressed, only movement of the knob 52 along the predominant axis is recognized even though multiple axis are enabled and weaker movements are noted along other axes.

Figure 18:
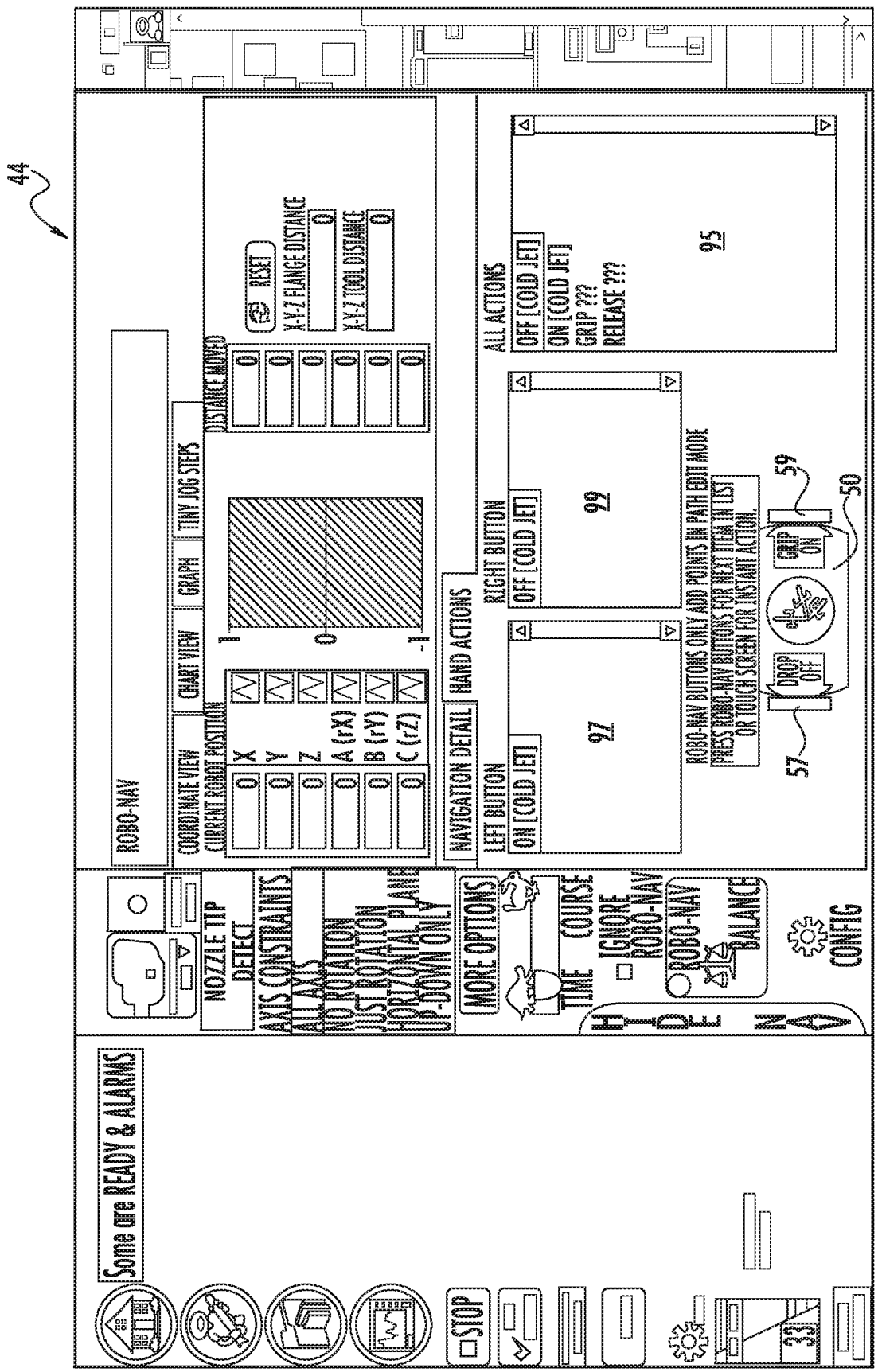
FIG. 18 shows a front view of yet another control screen of the robotic navigation system of FIG. 4A.

In at least one exemplary embodiment shown in FIG. 18, the user may define various actions for buttons on the handheld navigation unit 50. For example, the handheld navigation unit 50 may include a left button and a right button (illustrated in FIG. 18 by reference numerals 57 and 59). The user may create custom actions for the buttons 57 and 59 or select an action from a list of actions in box 95. One action may be placed in box 97 for the left button 57, and one action may be placed in box 99 for the right button. These buttons then provide further control for the user of the handheld navigation unit 50. In at least one embodiment the actions provided for the buttons 57 and 59 relate to control of a robotic grip or control of a robotic tool.

In one exemplary embodiment, the robotic navigation system 40 may include a number of additional buttons in the form of jog buttons. The jog buttons may include buttons identified as + and − for each of the six control axes. The user may press one or more of these buttons to create movement of the robot using the buttons in lieu of movement of the knob 52.

In addition to the foregoing, it will also be appreciated that the robot may further be controlled based on input from a sensor (e.g., sensor 80 as shown in FIG. 4A) configured to monitor any of various status parameters for the robot. Additional discussion concerning robot control based on input from one or more sensors is discussed in further detail below under the heading "Intelligent Cleanup of Hand Guided Robot Paths".

Flowchart for Robotic Navigation Method

Figure 19:
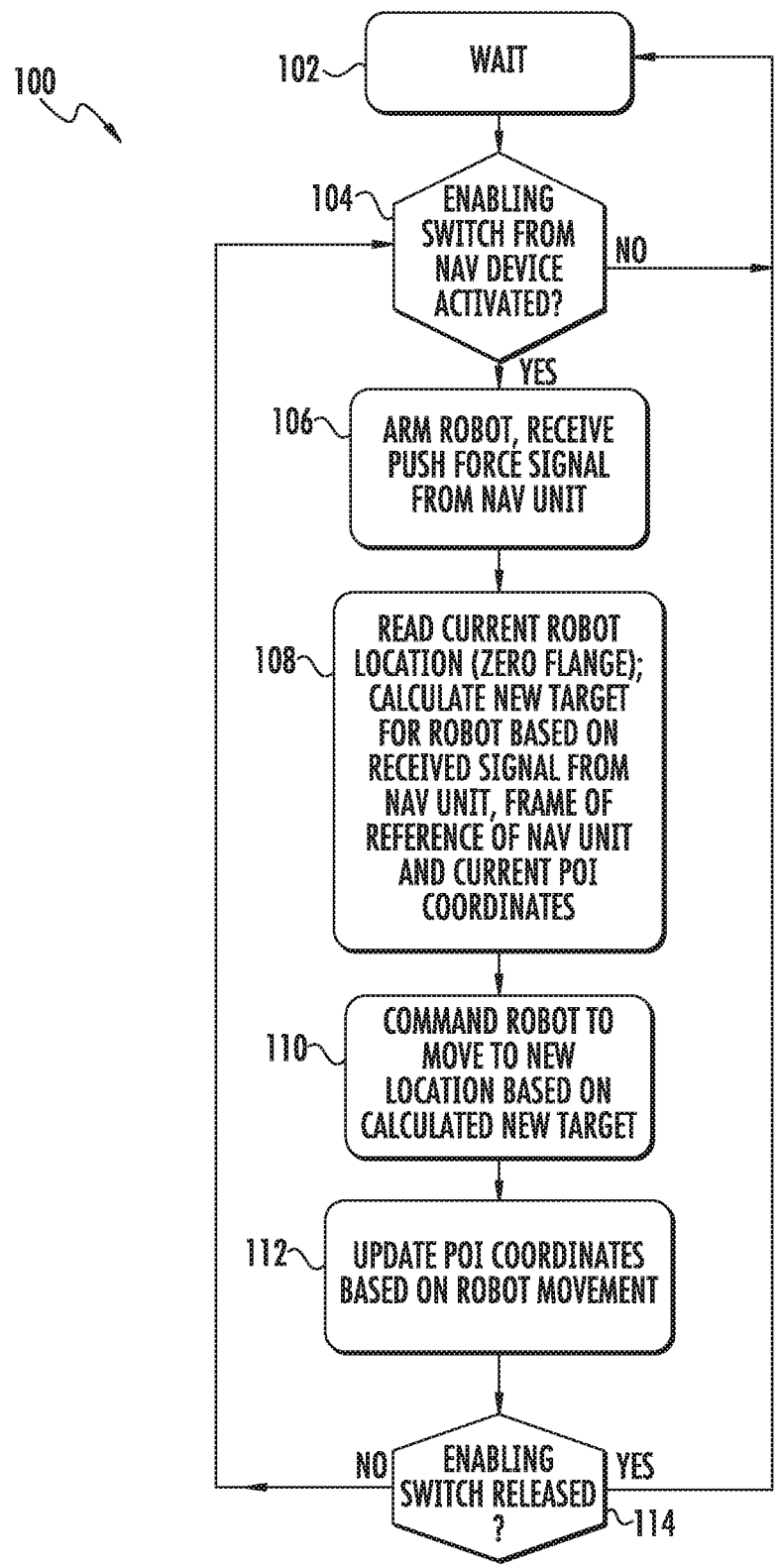
FIG. 19 is a flowchart showing steps taken by the robotic navigation system of FIG. 4A in order to move a robot.

With respect to FIG. 19, a method 100 of operating a robot using the robotic navigation system 40 is shown. According to the method, the electronic control unit 42 waits for a signal from the handheld navigation device 50 in step 102. Then, in step 104, a determination is made whether the safety enabling switch for the handheld navigation unit 50 has been enabled. If the safety enabling switch has not been enabled by the user, the method returns to step 102 and waits for another signal. However if the enabling switch has been enabled by the user, the electronic control unit 42 arms the robot in step 106 and receives the push force signal from the handheld navigation unit 50. As described previously, this push force signal is generally a multi-axis vector that includes a linear movement component, a rotational component, and a speed component. The electronic control unit 42 may manipulate this multi-axis vector by forcing to zero the axis that are disabled according to the motion settings (e.g., for purposes of maintaining a plane, or other limitations). The electronic control unit 42 may also multiply the vector by the speed setting to obtain an appropriate control signal based on the user input and the current settings of the robotic navigation system 40.

With continued reference to FIG. 19, after receiving and manipulating the signal from the handheld navigation unit 50 in step 106, the method moves to step 108 and the electronic control unit 42 reads the current robot location. This location is typically the mounting flange location (e.g., a zero flange location) within a current frame of reference. The electronic control unit 42 then calculates a new target position for the robot (e.g., a new zero flange location) based on the received and manipulated signal from the handheld navigation unit 50, the frame of reference for the handheld navigation unit 50, and any current point of interest coordinates. As discussed previously, the frame of reference and point of interest coordinates (e.g. tool coordinates) will vary depending on the mode of operation for the robotic navigation system 40. Calculation of a new target position thus includes translating the vector received from the handheld navigation unit into a robot motion vector. This may include the use of transforms for tool coordinates. As discussed previously, the use of tool coordinates forces rotation to be centered about the point of interest, instead of simply the end of the robot (i.e., the mounting flange).

Next, in step 110, the method continues by commanding the robot to move to the calculated new location based on the calculated new target coordinates. This action may generally include transmitting (e.g., via wired or wireless connection to the robot) the calculated motion vector to the robot, taking into account the current and previous position of the robot.

When the robot moves, the handheld navigation unit may relax (or return to a neutral position) as the robot position catches up to the request.

Thereafter, in step 112, the electronic control unit 42 updates the point of interest coordinates (e.g., the tool coordinates) based on movement of the robot. It will be recognized that this updating of the point of interest coordinates typically occurs only in the fixed tool mode, described above with reference to FIGS. 12, 15 and 16. In the world coordinates mode (described above with respect to FIG. 10) and the tool coordinates mode (described above with respect to FIG. 11), the point of interest coordinates are either not used or are fixed in relation to the mounting flange 18. Accordingly, there is no need to update the point of interest coordinates in the world coordinates mode and the tool coordinates mode.

In step 114, the electronic control system determines whether the enabling switch has been released. If the enabling switch has been released, the method returns to step 102 and waits for another control signal from the handheld navigation unit. If the enabling switch has not been released, the method returns to step 104, and the process is repeated, including receiving the next push force signal, moving the robot, and updating point of interest coordinates.

Intelligent Cleanup of Hand Guided Robot Paths

In the above exemplary embodiments, control of the robot has been explained with primary reference to movement of the handheld navigation device 50. However, as noted above, in at least one embodiment the robot may further be controlled based on input from one or more sensors, such as sensor 80 shown in FIG. 4A. The sensor 80 may be provided in any of various forms and configured to monitor one or more status parameters for the robot and send signals related to such status parameter. The status parameters monitored by the sensor may be status parameters related to the robot and a surface that the robot moves relative to. Examples of status parameters include a distance from a surface or distance from a surface feature (e.g., an offset distance from a surface groove or distance from an edge of a part to be worked on by the robot), force applied to a surface by a tool (e.g., force applied to the surface of a part by a cutting tool), as well as any of various additional status parameters. Accordingly, the term "status parameter" as used herein refers to some relationship between the robot and a part of interest. The surface of a part of interest to the robot may be referred to herein as a "working surface".

The sensor 80 may be provided in any of various forms and configurations in order to monitor the identified status parameter and provide signals indicative of the status parameter. For example, the sensor 80 may be a two-dimensional laser and camera combination configured to view the cross-sectional shape of a part and monitor the distance a tool held by the robot is from a groove on the surface of the part (e.g., determine the distance a spray gun or ultrasonic knife is from the working surface), and send signals indicative of such distance. In this embodiment, the laser is configured to direct laser light on to the working surface, and the camera is configured to detect laser light reflected from the working surface. As another example, the sensor 80 may be a force sensing transducer or other force sensor configured to determine a force being applied to the part by the tool (e.g., determine a force applied to the working surface by a router or grinder), and send signals indicative of such force. While the foregoing provides two exemplary types of sensors 80, it will be recognized that any of various sensors and sensor arrangements may be utilized. For example, the sensor may be a single camera, a pair of cameras (providing stereo vision), positional sensors provided by LVDTs, or other contact style position sensors, ultrasonic sensors for non-contact distance measurement, or any of various other sensor types and arrangements.

The sensor 80 may be positioned in any appropriate location in order to properly measure the status parameter of interest. For example, if the sensor is a positional sensor including a laser, the sensor may be provided on the tool mount or the end of the tool arm in order to properly determine a distance from the working surface. Similarly, if the sensor is a force sensor, the sensor may be provided on the tool mount and determine the force applied at the tool mount. Signals sent by the sensor 80 to the robot control interface panel 42 may be in any of various forms using any of various protocols. Although the sensor 80 in FIG. 4A is shown as having a direct connection to the robot control interface, it will be appreciated that communications between the sensor 80 and the robot control interface 42 may be accomplished using either wired or wireless communications using any of various protocols as will be recognized by those of ordinary skill in the art. Wireless communications between the sensor 80 and the robot control interface 42 may be desirable in many instances based on the location of the sensor 80 and movement functions of the robot 10.

As discussed above, the handheld navigation device 50 may be used to teach paths for the robot 10. However, these hand-taught paths are often rough and imperfect. In particular, while the handheld navigation device 50 is used by a human to indicate a commanded movement for the robot and generate associated movement signals, the commanded movement for the robot is subject to the imperfection of human motion. Thus, movement signals from the handheld navigation device 50 are such that the generated movement signals take the robot often outside of a desired path. The system disclosed herein provides for advantageous alignment, calibration and cleanup of the movement commands from the handheld navigation device 50 with a desired path. This is accomplished by the user defining a target measurement (i.e., a single number) or target range (i.e., a numerical range) for one or more status parameters of the robot, and monitoring such status parameters using the sensor 80. Control of the robot is then based not only on the movement signals received from the handheld navigation unit 50, but also based on the monitored status parameters and associated target measurement or target range as defined by the user.

Figure 20:
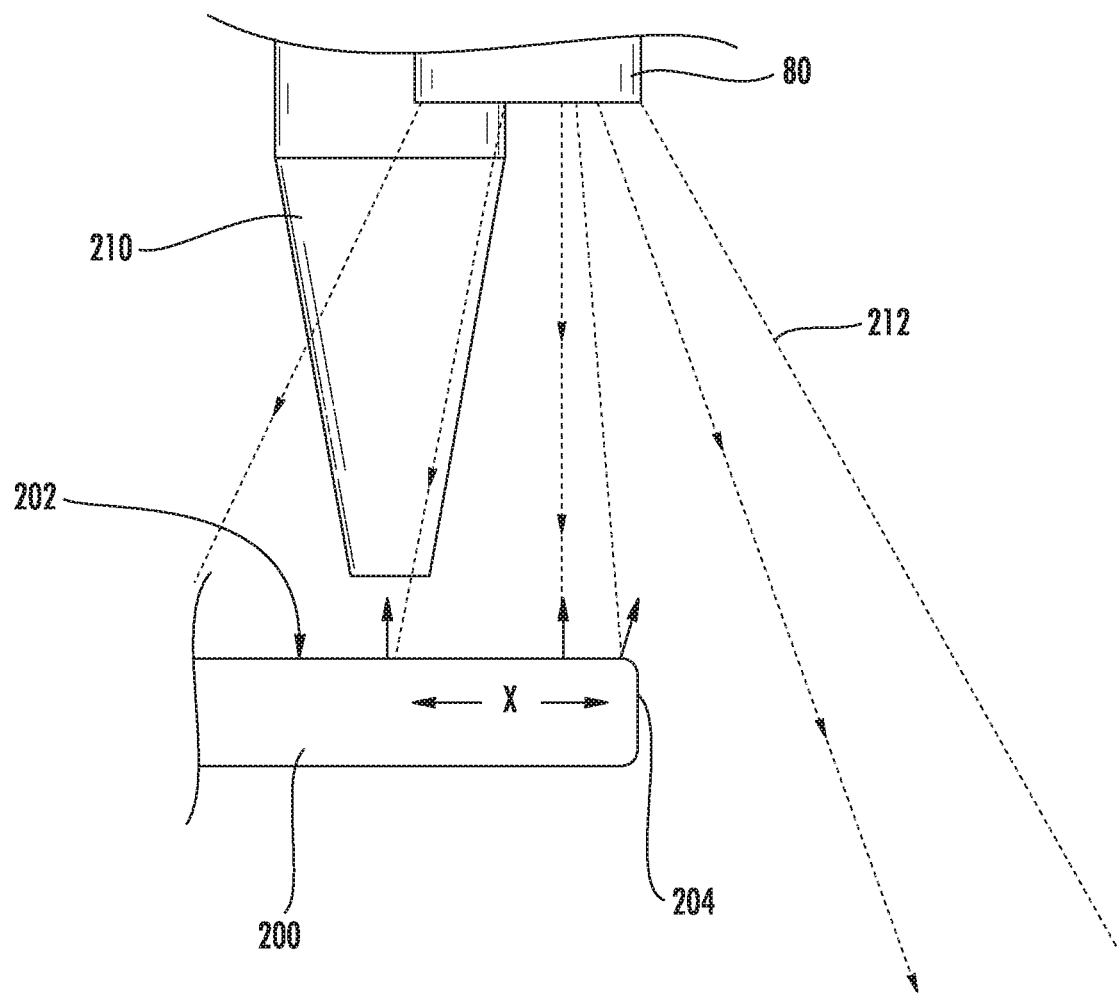
FIG. 20 is an side view of a tool tip and sensor of the robotic navigation system of FIG. 4A in proximity of a working surface.

With reference now to FIG. 20, a cross-sectional view of a part 200 is shown including a working surface 202 having a perimeter 204. A tool tip 210 is shown above the part 200. The tool tip 210 is held by a robot controlled using the robotic navigation system 40 of FIG. 4A. The tool tip may be, for example, a dispenser configured to deliver a bead of glue along the surface 202 of the part 200. A sensor 80 is positioned on the robot in such a manner that it is fixed in relation to the tool tip 210. The sensor 80 is a two-dimensional laser and camera combination configured to direct a beam 212 of laser light in the direction of the part 200. Some of the light beam 212 does not strike the surface 202 and is not reflected back to the camera of the sensor 80. However, other portions of the light beam 212 does strike the surface 202 and is reflected back to the sensor 80. Based on the light reflected back to the sensor 80, the sensor 80 is able to determine the location of the perimeter 204 of the part. Because the sensor 80 is fixed relative to the tool tip 210, the sensor is able determine a lateral distance "x" that separates the tool tip 210 from the perimeter 204 of the part 200. This lateral distance "x" between the tool tip and the perimeter 204 of the part 200 is a status parameter that is monitored by the robotic navigation system 40 as control signals for the robot are generated by the robot control interface panel 42.

Figure 21:
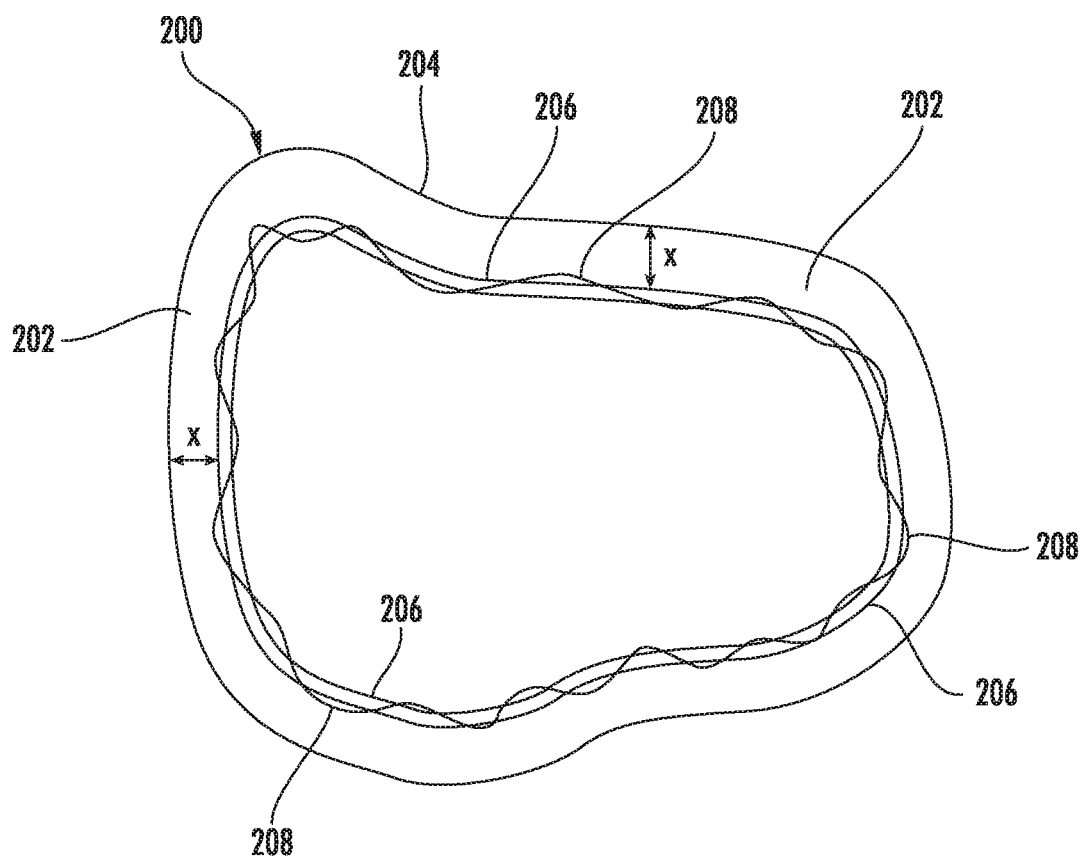
FIG. 21 is a plan view of the working surface of FIG. 20 illustrating a desired path and a human driven path.

FIG. 21 shows a plan view of the part 200 including the working surface 202 and the perimeter of the part 204. The user desires to apply a bead of glue to the working surface 202 using the tool tip 210. The user desires for this bead of glue to extend completely around the part 200 at a desired distance "x" from the perimeter of the part (e.g., 20 mm from the perimeter 204 of the part 200). The bold line in FIG. 21 represents this desired path 206. However, if the user attempts to use the handheld navigation device 50 to control the robot and move the tool tip around the part by sight, the user would teach the robot a path that does not closely follow the desired path 206, and instead includes a significant amount of human error with significant deviations from the desired path 206. This path with human error might look more like actual instructed path 208 in FIG. 21. Accordingly, in at least one embodiment, the user may configure the robotic navigation system 40 to monitor defined status parameters and automatically correct movement signals generated by the handheld navigation device to result in a desired path for the robot (e.g., a path closer to desired path 206, even though the actual path from provided by the human is more akin to instructed path 208).

Figure 22:
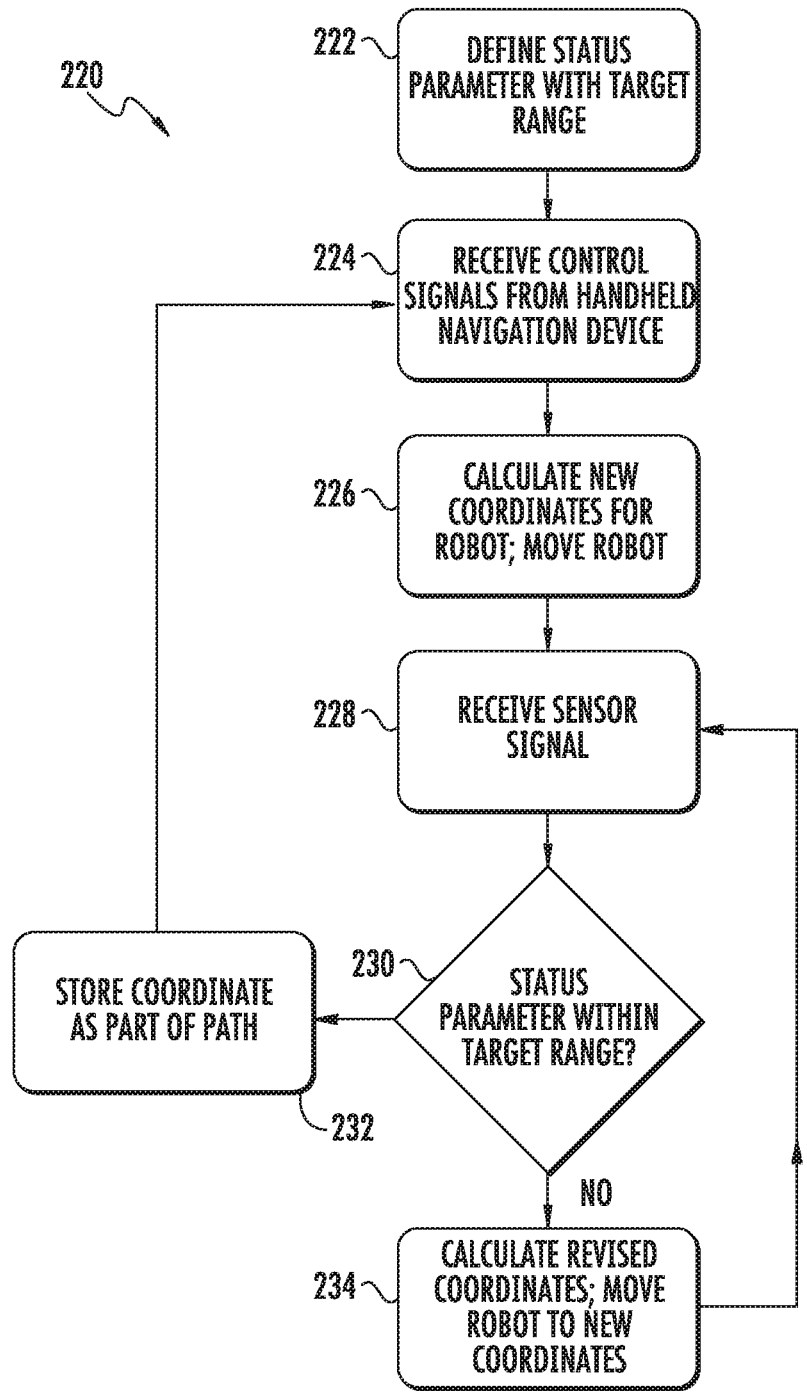
FIG. 22 is a flowchart showing a method of controlling a robotic navigation system to perform automatic cleanup of hand guided robot paths.
Figure 23:
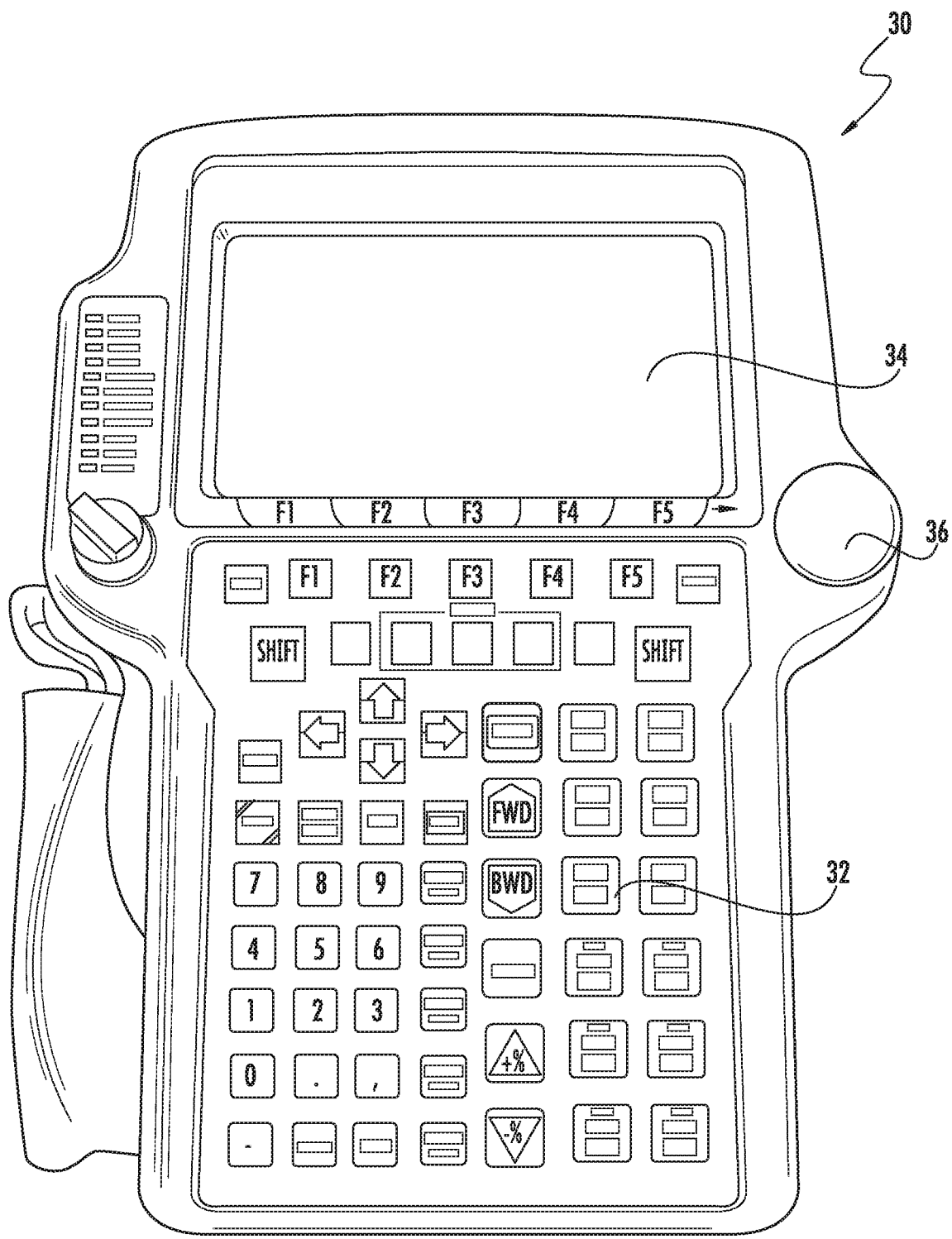
FIG. 23 is a prior art teaching pendant.

With reference now to FIG. 22, a method 220 is disclosed for controlling a robotic navigation system 40 to perform automatic cleanup of hand guided robot paths. The method begins with the user defining a status parameter, as noted in step 222. As noted previously, this status parameter may be any of a number of different status parameters, such as an offset distance of a tool from a surface or surface feature, a force to be applied by a tool, or any number of other status parameters. The status parameter is further defined by the user with a desired target range. The target range may be defined in a number of different ways. For example, if the status parameter is an "offset distance" from a perimeter of a part, the user may define a desired quantity for the offset distance (e.g., 20 mm) and an error margin (e.g., 20 mm+/−1 mm). As another example, if the status parameter is an offset distance from a surface of a part, the user may define the target range within certain boundaries (e.g., 9 mm-11 mm). Furthermore, the defined status parameter may be defined in numerous ways and include numerous components. For example, if the status parameter is an "offset distance", the status parameter may be defined as being within any number of dimensions (e.g., within some distance in the x-direction or z-direction) and may include multiple definitions that cover multiple dimensions (e.g., within 9-10 mm of the perimeter in the x-y plane, and within 2-3 mm of the surface along the z-axis).

With the status parameter defined, the user next begins to control the robot using the handheld navigation device 50 to teach the robot an instructed path. Accordingly, in step 224, the method continues with receiving control signals from the handheld navigation device 50 as it is moved by the user. Signals from the handheld navigation device 50 may be provided in any of various modes, including those described above, such as the use of world coordinate mode (e.g., see FIG. 10), tool coordinate mode (e.g., see FIG. 11), and fixed/remote tool coordinate mode (e.g., see FIG. 12).

In step 226, the method continues with the calculation of new coordinates for the robot. In the disclosed embodiment, this is performed by the robot control interface panel 42 determining the current robot coordinates and calculating new coordinates based on the control signal vector received from the handheld navigation device 50. Once the new coordinates are calculated the control signals for these coordinates are sent to the robot controller 11, and the robot is moved to the new location.

After the robot is moved to the new location, the robot control interface panel 42 receives signals from the sensor 80, as noted in step 228. The sensor 80 provides sensor signals that indicate a current status parameter for the robot (e.g., distance from a surface feature on a working surface). After receiving the sensor signal providing the status parameter, the method continues to step 230 where a determination is made whether the status parameter is within the target range.

If the status parameter is within the target range in step 230, the method continues to step 232, and the new coordinates are stored as part of the desired path for the robot. However, if the status parameter is not within the target range in step 230, the method continues to step 234. In this step, the robot control interface panel 42 calculates revised coordinates for the robot. These revised coordinates are calculated to place the robot within the target range. For example, if the target range is within 1 mm of a particular surface feature (e.g., the apex of a groove on the working surface), and the sensor signal indicates that the robot is 2 mm away from the surface feature, the robot control interface panel 42 will automatically calculate a new coordinate for the robot such that the robot will be within the target range. The robot control interface panel 42 may make this new calculation using any of multiple methods. For example, if the robot is 1 mm outside of the target range for a distance from a perimeter edge, the newly assigned coordinates may move the robot 1.1 mm closer (or further away, as the case may be) from the perimeter edge in a direction that is directly perpendicular to perimeter edge. After calculating the revised coordinates, the control signals for these coordinates are sent to the robot controller 11, and the robot is moved to the new location associated with the revised coordinates.

After completing step 234, the method returns to step 228, and the robot control interface panel 42 once again receives a sensor signal from the sensor 80. If the robot is now within the target range (in step 230), the method moves on to step 232, and the revised coordinates are saved as part of the desired path taught to the robot. The method then returns to step 224 and continues to receive control signals from the handheld navigation device. It will be appreciated that the method 220 of FIG. 22 moves through steps 224-232 many times each second. During this time, any control signals from the handheld navigation device that would take the robot off the desired path (as defined by the status parameter within a target range) are immediately corrected, and the robot remains on or very close to the desired path as the user teaches the robot the desired path. In this manner, although the user is steering the robot, the robot is kept on the desired path by the robotic navigation system 40 being configured to perform automatic cleanup of hand guided robot paths.

The above-described method and arrangement wherein the robotic navigation system 40 is configured to perform automatic cleanup of hand guided robot paths provides numerous advantages. The described control options introduce external measurements that are used to drive or maintain robot orientation and offsets. This allows for force, position, and feature tracking in conjunction with human manipulation. For example, if the user is training a painting path and wishes to maintain a fixed offset distance of the spray head, the above-described added control dimension allows the user to easily accomplish this. As another example, if the user wishes to drive the robot around the perimeter of a part for trimming, the above-described arrangement and method allows for this, causing the robot to maintain, and/or correct the path in order to follow the edge in a precise manner. In this example, a general direction may be requested by the operator to move the robot around the part, but the true offset height and edge position may be dynamically controlled with the above-described control system.

The foregoing detailed description of one or more exemplary embodiments of the robotic navigation device and system has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed exemplary embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the exemplary embodiments contained herein.

What is claimed is:

1. A robotic navigation system configured to move a robot, the robotic navigation system comprising:
    a handheld navigation unit associated with a frame of reference, the handheld navigation unit moveable with respect to a plurality of axes, the handheld navigation unit configured to send movement signals based on movement of the handheld navigation unit; and
    a robot controller configured to receive the movement signals from the handheld navigation unit and generate robot control signals for the robot based on the movement signals from the handheld navigation unit, the robot control signals configured to incrementally move the robot based on a distance between a fixed point on the robot and a point of interest on a stationary tool that is removed from the robot, the point of interest defined by assigned coordinates that define the distance between the point of interest and the fixed point on the robot, the robot controller configured to reassign the assigned coordinates for the point of interest following each incremental movement of the robot such that the assigned coordinates change with each incremental movement of the robot relative to the point of interest, wherein the robot control signals cause the robot to move so as to change the distance between the point of interest and the fixed point on the robot so that movements of the handheld navigation unit define a relative motion of the point of interest with respect to the fixed point on the robot;
    wherein the controller is configured to selectively operate in (i) a first mode when the handheld navigation unit is mounted on and moveable with the robot, and (ii) a second mode when the handheld navigation unit is mounted at a stationary location with respect to the robot, wherein the robot controller generates robot control signals that result in movement of the robot in a same direction as movement of the handheld navigation in the first mode, and wherein the robot controller generates robot control signals that result in movement of the robot in an opposite direction to movement of the handheld navigation unit in the second mode.

2. The robotic navigation system of claim 1 wherein the fixed point on the robot is a mounting flange of the robot and wherein the point of interest on the stationary tool is a fixed point on the stationary tool.

3. The robotic navigation system of claim 1 wherein the controller is further configured to selectively operate in a third mode when the handheld navigation unit is mounted on the stationary location that is separate from the robot, wherein the robot controller generates robot control signals that result in movement of the robot in a same direction as movement of the handheld navigation in the third mode.

4. The robotic navigation system of claim 1 wherein the handheld navigation unit includes a mount configured to engage any one of a plurality of mounting features positioned at a plurality of mounting points on the robot or in proximity of the robot, wherein each of the plurality of mounting points is associated with a unique frame of reference.

5. The robotic navigation system of claim 4 wherein the plurality of mounting features include magnets configured to engage a magnet of opposite polarity on the handheld navigation unit.

6. The robotic navigation system of claim 4 wherein the plurality of mounting features includes unique identifiers.

7. The robotic navigation system of claim 6 wherein the unique identifiers are selected from one of RFID tags, barcodes, QR codes, and resistors.

8. The robotic navigation system of claim 1 wherein the controller is part of a mobile computer.

9. The robotic navigation system of claim 8 wherein the mobile computer includes a seat for the handheld navigation unit.

10. A method of controlling a robot comprising:
    generating movement signals based on moving a handheld navigation unit with respect to a plurality of axes, the handheld navigation unit associated with a frame of reference;
    transmitting the movement signals to a robot controller;
    receiving the movement signals at the robot controller;
    generating, at the robot controller, robot control signals for the robot based on the movement signals from the handheld navigation unit, the robot control signals configured to incrementally move the robot based on a distance between a fixed point on the robot and a point of interest on a stationary tool that is removed from the robot, the point of interest defined by assigned coordinates that define the distance between the point of interest and the fixed point on the robot;
    incrementally moving the robot in response to the generated robot control signals, wherein incremental movement of the robot changes the distance between the point of interest and the fixed point on the robot such that movements of the handheld navigation unit define a relative motion of the point of interest with respect to the fixed point on the robot; and
    reassigning, at the robot controller, the assigned coordinates for the point of interest following each incremental movement of the robot such that the assigned coordinates change with each incremental movement of the robot relative to the point of interest.

11. The method of claim 10 further comprising, selectively operating the robot controller in (i) a first mode when the handheld navigation unit is mounted on and moveable with the robot, and (ii) a second mode when the handheld navigation unit is mounted at a stationary location with respect to the robot, wherein the robot controller generates robot control signals that result in movement of the robot in a same direction as movement of the handheld navigation in the first mode, and wherein the robot controller generates robot control signals that result in movement of the robot in an opposite direction to movement of the handheld navigation unit in the second mode.

12. The method of claim 11 wherein the controller is further configured to selectively operate in a third mode when the handheld navigation unit is mounted on the stationary location that is separate from the robot, wherein the robot controller generates robot control signals that result in movement of the robot in a same direction as movement of the handheld navigation in the third mode.

13. The method of claim 10 wherein the fixed point on the robot is a mounting flange of the robot and wherein the point of interest on the stationary tool is a fixed point on the stationary tool.

14. The method of claim 10 wherein the handheld navigation unit includes a mount configured to engage any one of a plurality of mounting features positioned at a plurality of mounting points on the robot or in proximity of the robot, wherein each of the plurality of mounting points is associated with a unique frame of reference.

15. The method of claim 14 wherein the plurality of mounting features include magnets configured to engage a magnet of opposite polarity on the handheld navigation unit.

16. The robotic navigation system of claim 14 wherein the plurality of mounting features includes unique identifiers.

17. The robotic navigation system of claim 16 wherein the unique identifiers are selected from one of RFID tags, barcodes, QR codes, and resistors.

18. The robotic navigation system of claim 10 wherein the controller is part of a mobile computer.

19. The robotic navigation system of claim 18 wherein the mobile computer includes a seat for the handheld navigation unit.

* * * * *